(12) United States Patent
Chang

(10) Patent No.: US 7,369,648 B1
(45) Date of Patent: May 6, 2008

(54) APPARATUS AND METHOD FOR PBX-INTEGRATED UNIFIED MESSAGING SERVICES ON A SWITCHED BACKBONE

(75) Inventor: Jack H. Chang, San Jose, CA (US)

(73) Assignee: Purplecomm, Inc., Santa Clara, CA (US)

( * ) Notice: Subject to any disclaimer, the term of this patent is extended or adjusted under 35 U.S.C. 154(b) by 740 days.

(21) Appl. No.: 09/611,178

(22) Filed: Jul. 6, 2000

(51) Int. Cl.
*H04M 1/64* (2006.01)
*H04M 11/00* (2006.01)

(52) U.S. Cl. .............................. 379/88.25; 379/88.08; 379/88.14; 379/88.17; 379/88.18; 379/100.08; 709/208

(58) Field of Classification Search ........... 379/201.01, 379/233, 88.13, 88.17, 100.08, 88.25, 88.08, 379/88.14, 88.18
See application file for complete search history.

(56) References Cited

U.S. PATENT DOCUMENTS 5,031,206 A    7/1991  Riskin .......................... 379/97

(Continued)

OTHER PUBLICATIONS

"Microsoft Press Computer Dictionary", Microsoft Press, Third Edision, Copyright 1997 by Microsoft Corporation, p. 366.

(Continued)

*Primary Examiner*—Han Tsang
*Assistant Examiner*—Lisa Hashem
(74) *Attorney, Agent, or Firm*—Thelen Reid Brown Raysman & Steiner LLP

(57) ABSTRACT

PBX-integrated unified messaging capabilities are provided via a switched backbone (such as the Internet) without having to install or deploy on-premise unified messaging equipment. A Corporate Communication Platform ("CCP") typically located within a corporate subscriber's premises is integrated with the corporate subscriber's private branch exchange ("PBX") system and coupled to a switched backbone, such as the network commonly referred to as the Internet. The CCP comprises a local mailbox database that temporarily stores voice messages and/or facsimile transmissions for and transmits messages to individual subscribers associated with the corporate subscriber. A CCP forms part of a wide-area unified messaging system, and connects to this wide-area unified messaging system via the switched backbone. The wide-area unified messaging system also comprises one or more System Communication Platforms ("SCP"). Each SCP in the wide-area unified messaging system may be located anywhere in the world that is accessible via the switched backbone, and may include a PSTN interface and/or a permanent mailbox database. Each SCP may also comprise a HTML Web server and/or an e-mail server to provide unified messaging capabilities. Each CCP is assigned to a SCP, and is slaved to the assigned SCP, such that the local mailbox database in the CCP is synchronized with the mailbox database of the SCP assigned to the CCP. Voice and fax messages received at the customer premise via the PBX are captured and stored at the CCP, which promptly uploads copies of the messages to its assigned SCP via the Internet. Once messages are received at the SCP, the individual subscriber can retrieve these messages via a web browser program, e-mail client program and/or the PSTN interface of the SCP. Conversely, copies of voice and fax messages received by the SCP via its PSTN interface are also promptly downloaded to the appropriate CCP, and the individual subscriber may retrieve these messages from his or her extension off the PBX.

63 Claims, 10 Drawing Sheets

U.S. PATENT DOCUMENTS

| | | | |
|---|---|---|---|
| 5,039,980 A | 8/1991 | Aggers et al. | 340/506 |
| 5,115,362 A | 5/1992 | Harada et al. | 360/92 |
| 5,333,266 A | 7/1994 | Boaz et al. | 395/200 |
| 5,349,636 A | 9/1994 | Irribarren | 379/89 |
| 5,377,191 A | 12/1994 | Farrell et al. | 370/94.1 |
| 5,479,411 A | 12/1995 | Klein | 370/110.1 |
| 5,530,740 A | 6/1996 | Irribarren et al. | 379/89 |
| 5,557,539 A | 9/1996 | Fitch | 709/206 |
| 5,557,659 A | 9/1996 | Hyde-Thomson | 379/88 |
| 5,577,202 A | 11/1996 | Padgett | 709/206 |
| 5,581,749 A | 12/1996 | Hosssian et al. | 395/600 |
| 5,608,643 A | 3/1997 | Wichter et al. | 364/479.14 |
| 5,608,786 A | 3/1997 | Gordon | 379/100 |
| 5,633,916 A | 5/1997 | Goldhagen et al. | 379/67 |
| 5,647,002 A * | 7/1997 | Brunson | 709/206 |
| 5,661,516 A | 8/1997 | Carles | 348/8 |
| 5,675,507 A | 10/1997 | Bobo, II | 364/514 R |
| 5,715,393 A | 2/1998 | Naugle | 709/224 |
| 5,727,156 A | 3/1998 | Herr-Hoyman et al. | 709/219 |
| 5,737,395 A | 4/1998 | Irribean | 379/88 |
| 5,740,231 A | 4/1998 | Cohen et al. | 379/89 |
| 5,740,362 A | 4/1998 | Buickel et al. | 709/200 |
| 5,745,689 A | 4/1998 | Yeager | 395/200.36 |
| 5,751,792 A * | 5/1998 | Chau et al. | 379/88.17 |
| 5,751,960 A | 5/1998 | Matsunaga | 395/200.36 |
| 5,754,306 A | 5/1998 | Taylor et al. | 358/400 |
| 5,786,770 A | 7/1998 | Thompson | 340/825.06 |
| 5,790,793 A | 8/1998 | Higley | 709/218 |
| 5,793,763 A | 8/1998 | Mayes et al. | 370/389 |
| 5,794,039 A | 8/1998 | Guck | 395/683 |
| 5,805,203 A | 9/1998 | Horton | 348/12 |
| 5,809,237 A | 9/1998 | Watts et al. | 709/202 |
| 5,812,773 A | 9/1998 | Norin | 709/204 |
| 5,812,795 A | 9/1998 | Horovitz et al. | 395/200.75 |
| 5,813,009 A | 9/1998 | Johnson et al. | 707/100 |
| 5,828,842 A | 10/1998 | Sugauchi et al. | 709/223 |
| 5,828,888 A | 10/1998 | Kozaki et al. | 395/712 |
| 5,835,743 A | 11/1998 | Zucker | 395/376 |
| 5,838,458 A | 11/1998 | Tsai | 358/402 |
| 5,838,923 A | 11/1998 | Lee et al. | 709/236 |
| 5,881,292 A | 3/1999 | Sigal et al. | 395/712 |
| 5,903,726 A | 5/1999 | Donovan et al. | 709/206 |
| 5,925,137 A | 7/1999 | Okanoue et al. | 714/4 |
| 5,926,463 A | 7/1999 | Ahearn et al. | 370/254 |
| 5,930,471 A | 7/1999 | Milewski et al. | 709/204 |
| 5,931,909 A | 8/1999 | Taylor | 709/221 |
| 5,974,122 A | 10/1999 | Nelson et al. | 345/331 |
| 5,974,449 A | 10/1999 | Chang et al. | 709/206 |
| 5,978,840 A | 11/1999 | Nguyen et al. | 709/217 |
| 6,014,644 A | 1/2000 | Erickson | 705/37 |
| 6,018,762 A * | 1/2000 | Brunson et al. | 709/206 |
| 6,031,978 A | 2/2000 | Cotner et al. | 709/248 |
| 6,047,323 A | 4/2000 | Krause | 709/227 |
| 6,065,047 A | 5/2000 | Carpenter et al. | 709/218 |
| 6,118,791 A | 9/2000 | Fichou et al. | 370/468 |
| 6,138,153 A | 10/2000 | Collins, III et al. | 709/221 |
| 6,233,318 B1 * | 5/2001 | Picard et al. | 379/88.17 |
| 6,360,272 B1 * | 3/2002 | Lincke et al. | 709/238 |
| 6,487,278 B1 * | 11/2002 | Skladman et al. | 379/88.13 |
| 6,563,912 B1 * | 5/2003 | Dorfman et al. | 379/88.13 |
| 6,751,298 B2 * | 6/2004 | Bhogal et al. | 379/88.13 |
| 6,792,085 B1 * | 9/2004 | Rigaldies et al. | 379/88.13 |
| 6,804,336 B2 * | 10/2004 | Chiu | 379/100.08 |
| 7,136,461 B1 * | 11/2006 | Swingle et al. | 379/88.13 |
| 2002/0111991 A1 * | 8/2002 | Wood et al. | 709/203 |
| 2003/0177171 A1 * | 9/2003 | Brown et al. | 709/203 |
| 2006/0171420 A1 * | 8/2006 | Chu et al. | 370/503 |

OTHER PUBLICATIONS

Bellcore, "Simplified Message Desk Interface (SMDI) Generic Requirements", Technical Reference TR-NWT-000283, Issue 2, May 1991, pp. 1-22.

Service Communication Platform, Release 2.0, "Functional Requirements Specification" Rev. 1.02, Jun. 10, 1997, chapter 1-5.

Dialogic Voice Products, "D/42-NS™ Switch Integration Board", pp. 1-7.

Dialogic, "D/82JCT-U Revolutionary PBX Integration Platform" Apr. 25, 2000, pp. 1-4, http://www.dialogic.com/products/d_sheets/6040web.htm.

Lucent Technologies, "Versatile Remote Mailbox Management Software for Octel Message Servers" Apr. 22, 2000, pp. 1-3, http:www.octel.com/enterprises/unifiedmessaging/www.../index.htm.

Nortel Networks, "Norstar Voice Mail Requirements", Apr. 22, 2000, pp. 1-2, http://www.nortelnetworks.com/products/01/norstar.../messaging.htm.

Nortet Networks, "Desktop Messaging: The Power of Information Access", Apr. 22, 2000, pp. 1-2, http://www.nortelnetworks.com/products/0.../desktop_messaging.htm.

Dialogic, "Taking Advantage of PBX Switch Integration in Computer Telephony Application", Jan. 1996, pp. 1-11.

Dialogic, "Dialogic Launches Industry's First Combined PBX Integration and Multimedia Platform", Apr. 25, 2000, pp. 1-3, http://www.dialogic.com/emea/press/300-combpbx.htm.

Dialogic, "PBXpert/32", pp. 1-3.

Dialogic, "DM3 IPLink DM/IP040-LSI" pp. 1-3.

Dialogic, "Become an Expert at PBX Integration", Apr. 25, 2000, pp. 1-3, http://www.dialogic.com/products/3732web.htm.

Dialogic, "Voice Mail", Apr. 25, 2000, pp. 1-5, http://www.dialogic.com/company/aboutct/ctapps/1804web.htm.

Dialogic, "IP Technology Basics", Apr. 25, 2000, pp. 1-9, http://www.dialogic.com/solution/internet/4070web.htm.

Dialogic, "D/41ESC, Global SCSA 4-Port Voice Processing Board", pp. 1-8.

Dialogic, "Enabling Unified Messaging, Unified Messaging with Dialogic Components Tames Communication Chaos", Apr. 25, 2000, pp. 1-15, http://www.dialogic.com/company/whitepap/5047web.htm.

\* cited by examiner

APPARATUS AND METHOD FOR PBX-INTEGRATED UNIFIED MESSAGING SERVICES ON A SWITCHED BACKBONE

BACKGROUND OF THE INVENTION

The present invention relates to the field of voice and data communication networks. More particularly, the present invention relates to providing PBX-integrated unified messaging services on a wide area network.

Private branch exchanges ("PBXs") are well known to those of ordinary skill in the art. A typical PBX includes a collection of telephone extensions that receive and transmit telephone calls. The PBX is coupled to an outside telephone network such as a public switched telephone network ("PSTN") via a set of trunk lines. As is known to those of ordinary skill in the art, PBX systems often provide voice messaging functionality via locally connected messaging equipment. For the purposes of the present invention, the term "PBX" may be used synonymously with a similar type of device known as a "KTS" (or key telephone system).

Traditional unified messaging equipment, where voice messages, fax messages and e-mail messages can be retrieved by telephone or Personal Computer ("PC") using a web browser program (such as Microsoft™ Internet Explorer™) or an e-mail client program (such as Microsoft™ Outlook™) are known in the art. For corporate users with a corporate PBX, a traditional unified messaging system is typically installed at the corporate premise behind the corporate PBX. Traditional unified messaging systems suffer the problem of complex installations and substantial maintenance cost because of the need to integrate with the corporate PBX and corporate Information Technology ("IT") infrastructures such as corporate e-mail server systems and corporate web server systems.

Independent unified messaging equipment which provide unified messaging capabilities without any PBX integration are also known in the art. These systems typically provide users with a unified messaging mailbox independent from the user's existing voice mailbox off his corporate PBX. Independent unified messaging systems suffer the problem that a corporate user would have to check two different mailboxes for his or her messages.

With the rapidly increasing popularity of global communication networks such as the switched backbone commonly referred to as the Internet, providing PBX-integrated unified messaging capabilities via such a switched backbone is desirable. As will be described in more detail in later in this document, the present invention provides a mechanism for corporate users to enjoy PBX-integrated unified messaging features without having to install on-premise unified messaging equipment. Instead, unified messaging features are delivered to the corporate users via the company's existing Internet connection from a network of high-end IP telephony messaging servers. In one embodiment, the present invention makes this possible through a combination of message gateways, message hosting servers, and the Internet. These and other features and advantages of the present invention will be presented in more detail in the following specification of the invention and in the associated figures.

SUMMARY OF THE INVENTION

PBX-integrated unified messaging capabilities are provided via a switched backbone (such as the Internet) without having to install or deploy on-premise unified messaging equipment. A Corporate Communication Platform ("CCP") typically located within a corporate subscriber's premises is integrated with the corporate subscriber's private branch exchange ("PBX") system and coupled to a switched backbone, such as the network commonly referred to as the Internet. The CCP comprises a local mailbox database that temporarily stores voice messages and/or facsimile transmissions for and transmits messages to individual subscribers associated with the corporate subscriber. A CCP forms part of a wide-area unified messaging system, and connects to this wide-area unified messaging system via the switched backbone. The wide-area unified messaging system also comprises one or more System Communication Platforms ("SCP"). Each SCP in the wide-area unified messaging system may be located anywhere in the world that is accessible via the switched backbone, and may include a PSTN interface and/or a permanent mailbox database. Each SCP may also comprise a HTML Web server and/or an e-mail server to provide unified messaging capabilities. Each CCP is assigned to a SCP, and is slaved to the assigned SCP, such that the local mailbox database in the CCP is synchronized with the mailbox database of the SCP assigned to the CCP. Voice and fax messages received at the customer premise via the PBX are captured and stored at the CCP, which promptly uploads copies of the messages to its assigned SCP via the Internet. Once messages are received at the SCP, the individual subscriber can retrieve these messages via a web browser program, e-mail client program and/or the PSTN interface of the SCP. Conversely, copies of voice and fax messages received by the SCP via its PSTN interface are also promptly downloaded to the appropriate CCP, and the individual subscriber may retrieve these messages from his or her extension off the PBX.

BRIEF DESCRIPTION OF THE DRAWINGS

The accompanying drawings, which are incorporated in and constitute a part of this specification, illustrate an embodiment of the invention and, together with the present description, serve to explain the principles of the invention.

In the drawings.

DETAILED DESCRIPTION

Those of ordinary skill in the art will realize that the following description of the present invention is illustrative only and not in any way limiting. Other embodiments of the invention will readily suggest themselves to such skilled persons, having the benefit of this disclosure. Reference will now be made in detail to an implementation of the present invention as illustrated in the accompanying drawings. The same reference numbers will be used throughout the drawings and the following description to refer to the same or like parts.

In the following description, an embodiment of the invention is described with regard to preferred process steps and data structures. Those skilled in the art would recognize after perusal of this application that embodiments of the invention can be implemented using circuitry in a microprocessor adapted to the particular process steps and data structures, and that implementation of the process steps and data structures described herein would not require undue experimentation or further invention. Moreover, different implementations may be used and may include other types of operating systems, computing platforms, computer programs, firmware and/or general purpose machines than those described herein. In addition, those of ordinary skill in the art will readily recognize that devices of a less general purpose nature, such as hardwired devices, devices relying on Field Programmable Gate Array ("FPGA") or Application Specific Integrated Circuit ("ASIC") technology, or the like, may also be used without departing from the scope and spirit of the inventive concepts disclosed herein.

Throughout this document, a "corporate subscriber" is a business or other entity that has integrated a PBX system 102 (shown in FIG. 1) with a Corporate Communication Platform ("CCP") 104 (shown in FIG. 1 and throughout the figures) according to aspects of the present invention. The term "corporate" is used simply for convenience, and is not intended to convey any legal implication. Therefore, a "corporate subscriber" is simply any organization (or individual, for that matter) having a PBX 102 integrated with a CCP 104 in accordance with the teachings of the present invention. An "individual subscriber" is a messaging user who may be associated with a corporate subscriber (e.g., an employee of a corporate subscriber having an extension off the PBX 102), and who has a "network mailbox" within the CCP and within the wide-area unified messaging network according to aspects of the present invention. A "non-subscriber" is a messaging user who does not have a network mailbox on the messaging network but who may still send messages to individual subscribers, which messages may be limited to certain message types.

Figure 1:
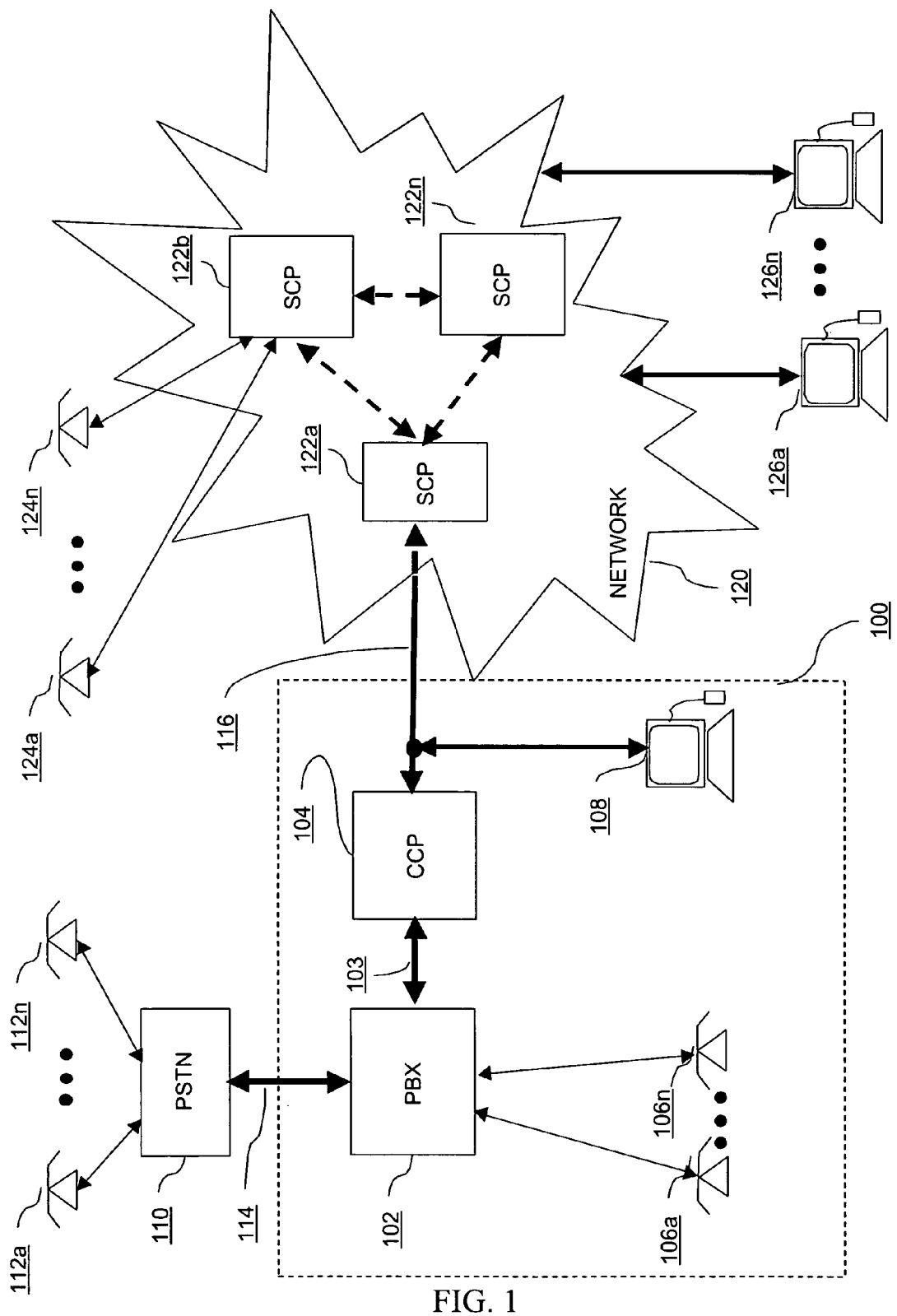
FIG. 1 is a schematic block diagram of a PBX-integrated unified messaging service-providing system according to aspects of the present invention.

FIG. 1 is a schematic block diagram of a unified messaging service-providing network integrated with a PBX system according to aspects of the present invention. As shown in FIG. 1, equipment typically located within a corporate subscriber's premises 100 comprises a PBX 102 coupled to a CCP 104 via PBX-CCP interface 103, and a set of one or more PBX extension terminals 106a-106n, where "n" can be any suitable number. Without limitation, PBX extension terminals 106a-106n may comprise any combination of telephone handsets, modems, or fax machines. At least in the case of telephone handsets, PBX extension terminals 106a-106n will typically have a "message waiting" light (not shown) which turns on whenever a new message is received and stored in the corresponding "mailbox" of an individual subscriber.

PBX 102 is coupled to a PSTN 110 via a set of trunk lines 114. Without limitation, PSTN terminals 112a-112n coupled to PSTN 110 may also comprise any combination of telephone handsets, modems, or fax machines.

In addition to being coupled to PBX 102 via PBX-CCP interface 103, CCP 104 is also coupled to a data communication network 120 via a network interface 116. Data communication terminal 108 (of which there may be more than one) may also be coupled to a data communication network 120 and to CCP 104 via network interface 116. Without limitation, data communication terminal 108 may comprise any suitable form of computing device (such as a personal computer) having networking and/or multimedia capabilities, and may comprise a display terminal, an e-mail client, a web browser, a microphone, and one or more speakers. The precise hardware configuration and components of data communication terminals 108 is not critical, and is dependent on the requirements of each particular implementation.

Network 120 may comprise any suitable form of LAN or WAN, or any suitable combination of LANs and/or WANs. In one embodiment, network 120 comprises the switched backbone of networks commonly referred to as "the Internet." One or more System Communication Platforms ("SCP") 122a-122n are accessible via network 120. Each SCP 122 may be located anywhere in the world that is accessible via network 120, and each SCP 122 serves a predetermined geographic area. Each CCP 104 is assigned to one SCP 122 (although each SCP 122 may service multiple CCPs 104). As will be described in more detail later, each CCP is slaved to its assigned SCP, such that the local mailbox database in a CCP is synchronized with the mailbox database of the SCP assigned to that CCP. SCPs 122a-122n communicate with each other and with one or more CCPs 104 via network 120 and network interface 116. In addition, SCPs 122a-122n and the CCPs 104 may communicate via network 120 with data communication terminals 126a-126n, which may be located anywhere in the world that is accessible via network 120. Without limitation, data communication terminals 126a-126n may comprise any suitable form of computing device (such as a personal computer) having networking and/or multimedia capabilities, and may comprise a display terminal, an e-mail client, a web browser, a microphone, and one or more speakers. The precise hardware configuration and components of data communication terminals 126a-126n is not critical, and is dependent on the requirements of each particular implementation. For the sake of clarification, it should be noted that (in the context of the present invention) the only difference between data terminal 108 and data terminals 126a-126n shown in FIG. 1 is that data terminal 108 is located with the corporate subscriber's premises 100, whereas data terminals 126a-126n may be located anywhere that is accessible via network 120.

As will be described in more detail in subsequent sections of this document, each SCP 122 may comprise a PSTN interface module. Any SCP 122 having a PSTN interface module may be coupled to a set of terminals 124a-124n via a PSTN local to that specific SCP 122. Without limitation, terminals 124*a*-124*n* may comprise any combination of telephone handsets, modems, or fax machines. The networked communication platforms (i.e., SCPs 122*a*-122*n* and all CCPs 104) form a global communication system capable of supporting unified messaging services (e.g., voice, fax, and/or e-mail messaging) between or among individual subscribers and non-subscribers.

Figure 2:
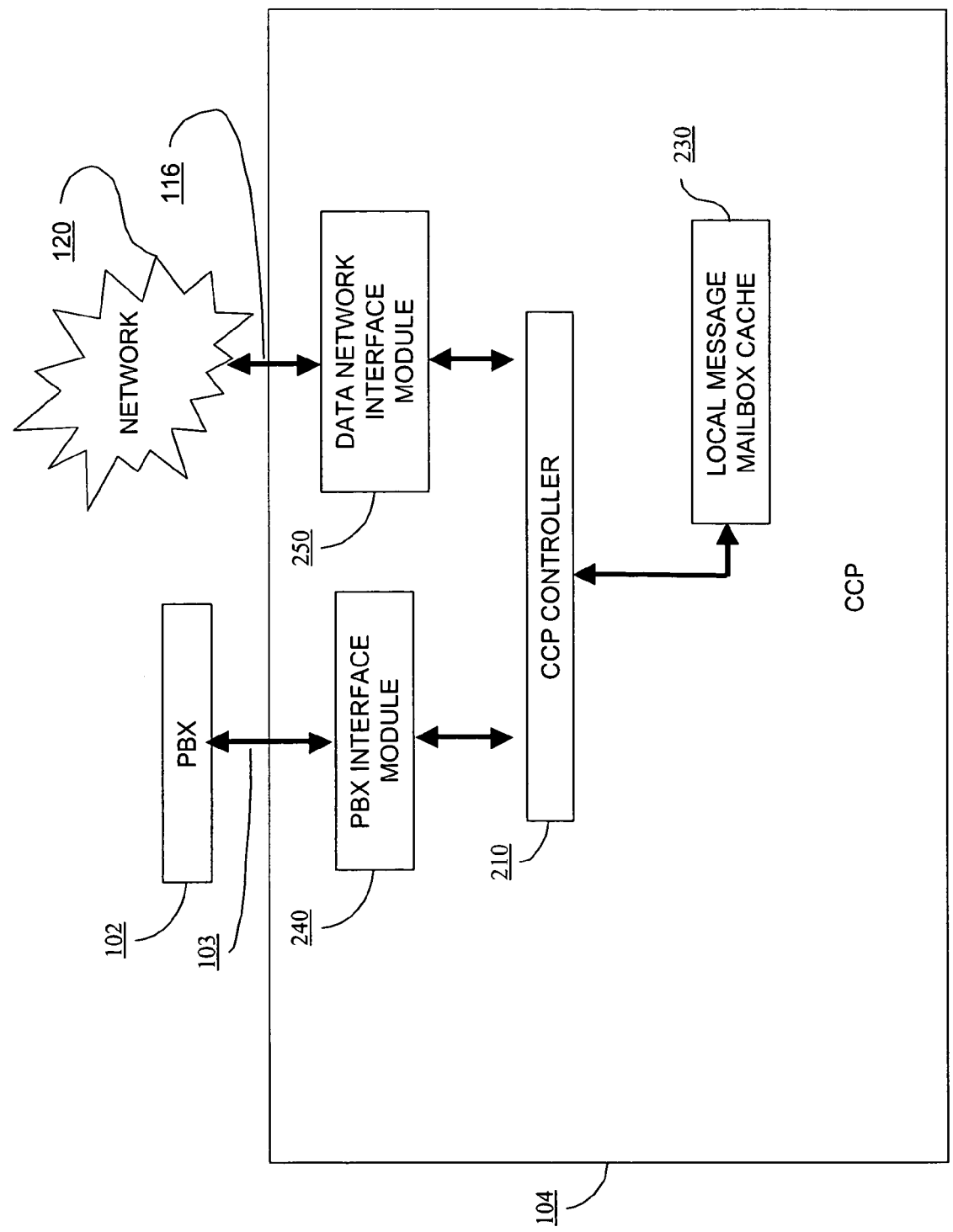
FIG. 2 is a schematic block diagram of a corporate communication platform according to aspects of the present invention.

FIG. 2 is a schematic block diagram of a corporate communication platform ("CCP") according to aspects of the present invention. As shown in FIG. 2, CCP 104 comprises a CCP controller 210, local message mailbox cache 230, PBX interface module 240, and data network interface module 250. CCP controller 210 may comprise any suitable processor-based system under program control, and may provide PBX integration functions, data network interface functions, database functions, and/or message mailbox interface functions, as will be described in more detail in subsequent sections of this document.

In one embodiment, CCP 104 comprises a general purpose computer system that operates under program control and has, among other things, a motherboard coupled to a hard drive, add-in card slots, a CPU, system bus, internal memory, and may include additional features and embodiments that are described in more detail throughout this document. CCP 104 also comprises a data network interface module 250 for interfacing with network 120 via network interface 116. In one embodiment, the hardware component of data network interface module 250 may comprise a commercially available LAN card for coupling to a local area network. Alternatively, a CCP may be coupled to network 120 through a switched backbone network interface directly or through a LAN card and one or more routers (not shown). As mentioned earlier, CCP 104 also supports networking to PBX extension terminals 106*a*-106*n* (shown in FIG. 1) coupled to PBX 102 through PBX interface module 240 and PBX-CCP interface 103. PBX-CCP interface 103 enables CCP 104 to simulate PBX extensions and to provide PBX-related functions, such as storing and retrieving messages and providing message waiting light functionality.

Still referring to FIG. 2, PBX network interface 103 to PBX 102 is accomplished via PBX interface module 240. The hardware component of PBX interface module 240 may be implemented by using a commercially available voice processing card running under program control, such as D41ESC or D/82JCT-U circuit boards ("the Dialogic boards") commercially available from the Dialogic Corporation of Parsipanny, N.J. Other products offering equivalent functionality are commercially available from the Dialogic Corporation and from other vendors. In one embodiment, PBX interface module 240 is managed and controlled by CCP controller 210 through program control using modules that make API calls to the programming interface corresponding to the Dialogic board. As will be described in more detail in subsequent sections of this document, this configuration enables corporate communication platform 104 to send and receive telephone calls from extensions defined within a PBX network that ultimately travel through network 120.

In one embodiment of the present invention, the hardware interconnection between PBX interface module 240 and PBX 102 is implemented through one or more telephone connections, commonly known as tip and ring pairs, enabling the transfer of voice data and control signals between CCP 104 and PBX equipment 102. The transfer of control signals between CCP 104 and PBX 102 enables CCP 104 to service telephone calls destined for PBX extensions such as extensions 106*a*-106*n* shown in FIG. 1. CCP 104 can provide PBX-like services such as call forwarding, call conferencing, message waiting light activation, and the like.

In one embodiment of the present invention, CCP 104 is configured, through PBX interface module 240 and a set of API program modules, to receive and decipher control signals in the "in-band" format. The in-band format is an industry term that is commonly used to refer to control signals used by a variety of PBX equipment manufacturers to integrate their PBX equipment with a voice mail system. The ability of CCP 104 to receive and decipher in-band formatted control signals enables it to be easily configurable with PBX equipment that has been designed to work with simple voice mail systems using control signals in the in-band format. There is currently no industry standard in-band format for these types of control signals. The in-band term is intended simply to refer to the type of control signals that are in the audio spectrum and hence, well suited for transmission on telephone lines, such as single line telephone connections. Dual Tone Multiple Frequency ("DTMF") signals are one set of in-band control signals that are commonly used. It should be noted that integration with any particular type of PBX equipment is entirely dependent on the specific vendor and model of the PBX equipment. However, implementation details regarding integration with virtually every type of PBX equipment currently known are well within the knowledge of those of ordinary skill in the art.

As is known in the art, a typical PBX 102 generates in-band control signals for each call that is forwarded to a voice mail system. The control signals include, among other things, the type of call being forwarded and the PBX extension number from which the call is being forwarded. By configuring CCP 104 to be responsive to these in-band control signals, which may include call type and the PBX extension number, CCP 104 can be configured through API functions in a manner described herewith to service phone calls received from a PBX that was originally designed to be compatible with voice mail systems supporting in-band integration.

In one embodiment of the present invention, instead of automatically accepting a call received from a PBX 102 for voice mail processing, CCP 104 deciphers control signals received from PBX 102 via interface 103, and uses the deciphered signals to determine how to service the call by accessing a configuration profile that corresponds to the call recipient's extension number. For example, if the called party had previously set his PBX extension to unconditionally forward a call to a target telephone number serviced by a remote communication platform, phone calls forwarded by PBX equipment 102 to CCP 104, which indicate that they are forwarded calls from a PBX extension, are forwarded by CCP 104 to a remote communication platform 122 (see FIG. 1) servicing the target telephone number as specified by the call recipient's configuration profile.

In one embodiment, the call type and PBX extension number may be represented as a sequence of control signals separated by a pound sign (#), where a leading digit represents the type of call being forwarded to CCP 104 from PBX equipment 102 and the following digits representing the PBX extension number from which the call is received. A leading digit of one (1) represents an incoming call that was forwarded from a PBX extension, while a leading digit of two (2) represents a direct call. A direct call in this context is defined as a call that is not forwarded from another PSTN network (or PBX extension) to CCP 104 but a call that originates from a PBX extension (or a PSTN telephone) and is received directly by CCP 104. Also, since control sequences in the in-band format are PBX dependent, CCP 104 is not intended to be limited to the above sequence of control signals but includes additional program modules that are capable of deciphering control signals in other in-band or other formats that are used by typical PBX equipment, enabling CCP 104 to be integrated with many different types of PBX networks.

As is known in the art, a large PBX network or central office switch may also be integrated with simple voice mail systems using a SMDI (Simplified Message Desk Interface) protocol. The SMDI protocol is defined in the reference entitled, "Simplified Message Desk Interface (SMDI) Generic Requirements from BellCore™, technical reference TR-NWT-00283, Issue 2, 1991. That document should be consulted for additional details concerning the SMDI protocol. However, a more detailed discussion of that document is not necessary herein for the purposes of understanding the present invention. Integration through the SMDI protocol requires using separate transmission layers for voice data and control signals. Specifically, voice data may be transmitted between a central office switch or PBX equipment and a voice mail system using at least one single line telephone connection, a T1 trunk or an E1 trunk, while control signals are transferred through a separate RS-232 serial line.

The present invention in this alternative embodiment is also capable of supporting large PBX equipment (or a central office switch), which typically has a separate voice transmission line and a separate control signal transmission line for transmitting voice data and control signals. In this case, voice data is passed between PBX equipment 102 (or central office switch) and CCP 104 through voice transmission line, while control signals are transferred through control signal transmission lines, such as RS-232 serial lines. This allows CCP 104 to provide PBX-like features to phone calls forwarded from a PBX extension (or a PSTN telephone supported by a central office switch). The difference in this alternative embodiment with the preferred embodiment described above is that control signals passed to CCP 104 are sent through a separate transmission line such as a RS-232 serial line. The control signals are received by CCP 104 through a separate interface and are then deciphered and acted upon by API functions, or equivalent means within CCP 104. This alternative PBX integration technique is known as "out of band" integration.

Like the control signals used in the in-band integration example described above, the SMDI protocol also provides for defining the type of call forwarded and PBX extension number (or a PSTN telephone number) from which the call was forwarded. This allows CCP 104 to distinguish between the types of calls such as direct or forwarded calls. Each control signal includes a type of call character that represents the type of call being forwarded and additional digits representing the PBX extension number (or a PSTN telephone number) from which the call is received. For example, a type of call character of "A" represents an incoming call that was unconditionally forwarded from a PBX extension (or a PSTN telephone number), while a type of call character of "D" represents a direct call.

Additional network interfaces may be included within CCP 104 to support additional networks, separately or in conjunction with the described networks above by adding additional messaging and telephone line units and program modules that make appropriate API calls to the corresponding Dialogic boards or similar equipment commercially available from other vendors. It should be noted that these networks may be owned and operated by an owner who may or may not be affiliated with an owner of a communication platform such as a CCP or a SCP. All of the above exemplary network connections are optional with respect to a given CCP 104 on the network, except that an interface to network 120 and to a PBX system 102 are required.

According to embodiments of the present invention, each system communication platform on the network (i.e., SCPs 122a-122n shown in FIG. 1) may provide unified messaging services by having a first network interface that can support the sending and receiving of messages and delivery information on a network. For example, the first network interface may be a telephone interface, which is linked to a first network such as a telephone network. A telephone network as used herein includes a public switch telephone network ("PSTN"), central office (E1, T1, etc.), cellular network, or any network that supports voice communication and destination addressing typically found in a standard telephone network. As is generally known, a standard telephone network supports user terminals that typically include telephones and fax machines. The telephone interface is responsible for managing voice and a facsimile communication such as answering incoming telephone calls as well as making outgoing calls through the telephone network.

It should be noted that a given SCP 122 on the network according to the present invention may or may not include such a telephone interface. SCPs 122 having a telephone interface have the capability of interfacing with a PSTN to answer calls from subscribers and other users, or to send calls to other telephone numbers to forward a subscriber's network messages stored in his or her network mailbox. Alternatively, an SCP 122 may be configured without a telephone interface. As long as such a SCP contains a network interface to connect to network 120 and to a network mailbox as described below, it can be used to store network mailboxes anywhere on the unified messaging network.

It should also be noted that a given SCP 122 on the network according to the present invention may or may not include a network mailbox. Network mailboxes will be described in more detail later in this document. Certain SCPs in the network according to aspects of the present invention may be configured to include a telephone interface and a switched backbone network interface, but not a network mailbox. In this configuration, a SCP 122 may be used to augment the number of telephone line interfaces that can be maintained at any given time, without incurring the additional expense of another network mailbox. According to embodiments of the present invention, SCPs with this configuration typically are used as additional SCPs in specific physical locations where there already exists a SCP with a network mailbox, but where additional telephone interface capacity is desired.

According to embodiments of the present invention, each communication platform (including all SCPs 122 and the CCP 104 shown in FIG. 1) also includes a second network interface that can support the sending and receiving of messages and associated delivery information on a network. For example, the second network interface may be an area network interface that is linked to an area network and communicates with an area network communication platform such as an e-mail communication platform, which is coupled to the area network. This permits the communication platform via the area network interface to send and receive e-mail messages from the e-mail communication platform or from area network clients such as personal computers and workstations which typically provide messaging capabilities and graphical user interfaces ("GUI"), as known in the art. The area network interface can also be configured to provide the functions of the e-mail communication platform.

A sender or a recipient of messages using embodiments of the present invention may either be an individual subscriber or a non-subscriber, and has the option of using any suitable messaging interface, including a telephone, fax machine, e-mail messaging program, or a web browser program. The messaging interfaces may be linked to a telephone network, an area network, a remote communication platform, or directly to the Internet through an internet service provider ("ISP") using a personal computer having a messaging interface such as a voice, fax, e-mail program or web browser program. It is presently contemplated that the present invention is not limited to the above types of telecommunications networks but has a scalable and modular design that can be modified to support other types of networks (e.g., a direct broadcast or satellite network) having the capability to send message types that include voice, fax, and e-mail data simply by adding another network interface to the communication platform that can support the additional network. For example, an intranet network interface may be added to the communication platform, where the intranet network interface supports the sending and reception of messages on an intranet. The above messaging types are illustrative only and are not intended to limit the invention in any way. For example, since the present invention has a scalable and modular design, it can be modified to include a network interface that can support the reception and transmission of messages having a video format.

According to embodiments of the present invention, a group of any desired number of communication platforms (including one or more SCPs 122 and one or more CCPs 104 as shown in FIG. 1) may be linked together using the switchable network 120 as a communication backbone to support messaging users located in a variety of physical locations throughout the world. Thus, referring to FIG. 1, exemplary SCPs 122a-122n may each be located in widely separated parts of the world, and many more additional communication platforms may be added to the network, in accordance with the design goals of each specific network configuration.

As presently contemplated, SCPs 122a-122n communicate with each other and with CCPs 104 using a protocol based on the commonly known TCP/IP protocol, although the use of this protocol is not intended to be limiting in any way, and any other suitable transmission protocol known to those of ordinary skill in the art to connect a group of communication platforms may be used.

According to one embodiment of the present invention, the Internet network interface in each SCP 122a-122n and in each CCP 104 enables each communication platform to use the Internet as a conduit to send or receive messages by supporting a variety of messaging interfaces that are typically used to send or receive messages on the Internet. Using FIG. 1 as an example, the switched backbone 120 supports the sending and receiving of fax, e-mail, and voice message types between subscribers and non-subscribers throughout the entire network. It is presently contemplated that the delivery information includes the recipient's destination address and the delivery format of the message.

Also, it is presently contemplated that one communication platform within the group of system communication platforms (i.e., SCPs 122a-122n) is designated as the Master Communication Platform ("MCP") for maintaining a global subscriber database. Each time there is a change to the global subscriber database, the master communication platform updates the subscriber databases in every SCP on the network, reflecting the changes to the global subscriber database.

Figure 3:
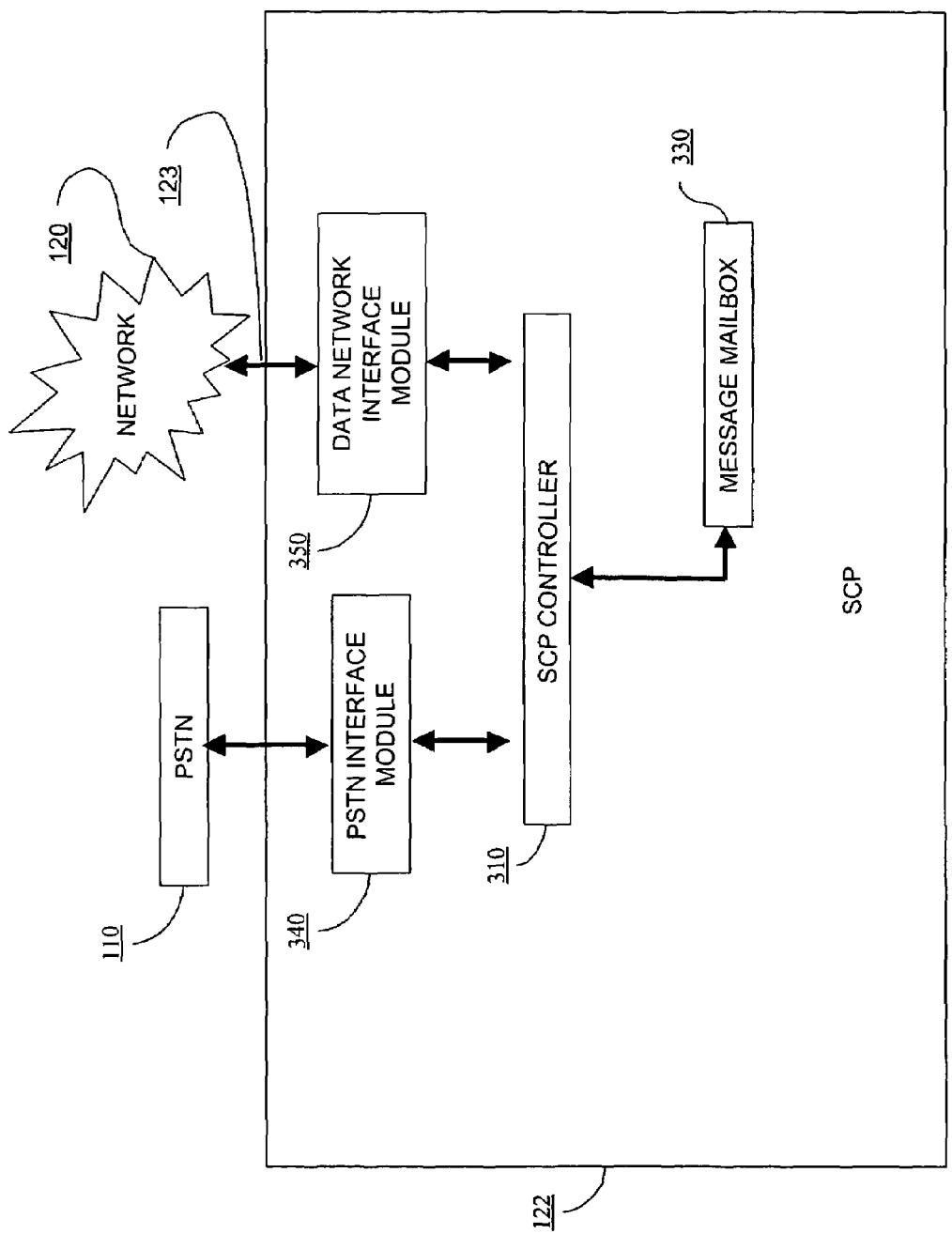
FIG. 3 is a schematic block diagram of a system communication platform according to aspects of the present invention.

FIG. 3 is a schematic block diagram of a system communication platform ("SCP") 122 according to aspects of the present invention. As shown in FIG. 3, exemplary SCP 122 comprises a SCP controller 310, message mailbox 330, PSTN interface module 340, and data network interface module 350. SCP controller 310 may comprise any suitable processor-based system under program control, and may provide PSTN integration functions, data network interface functions, e-mail server functions, web server functions, database functions, and/or message mailbox interface functions, as will be described in more detail in subsequent sections of this document. As mentioned earlier, a given SCP may or may not contain a PSTN interface module 340, and may or may not contain a message mailbox 330. However, data network interface module 350 or its equivalent is required.

In one embodiment, SCP 122 comprises a general purpose computer system that operates under program control and contains, among other things, a motherboard coupled to a hard drive, add-in card slots, a CPU, system bus, internal memory, and may include additional features and embodiments that are described in more detail throughout this document. An exemplary SCP is described in "Service Communication Platform," release 2.0, available from Carmel Connection, Incorporated, located at 70 Bonaventura Drive, San Jose, Calif. 95134, hereby incorporated by reference as if fully set forth herein. Also referring to FIG. 3, SCP 122 contains a PSTN interface module 340 for transceiving and managing telephone calls received from terminals 124a-124n shown in FIG. 1. In one embodiment of the present invention, this PSTN interface module 340 may comprise one or more Dialogic D41ESC boards or their equivalents, as mentioned earlier. Other products offering equivalent functionality are commercially available from the Dialogic Corporation and from other vendors. Control of messaging and telephone line unit is by program control using modules that make API (application program interface) calls to a programming interface, which is available from Dialogic Corporation, that is compatible with the Dialogic board.

SCP 122 also comprises a data network interface module 350 for interfacing with network 120 via a network interface, which may be similar or equivalent to network interface 116 shown in FIG. 1. In one embodiment, the hardware component of data network interface module 350 may comprise a commercially available LAN card for coupling to a local area network. Alternatively, a SCP may be coupled to network 120 through a switched backbone network interface directly or through a LAN card and one or more routers (not shown).

Thus, the unified messaging network of the present invention consists of multiple communication platforms installed in various locations worldwide, networked together over network backbone such as the Internet. The communication platforms host the unified messaging network mailboxes for the subscribers, and allow users to access the network mailboxes via either the telephone network or the Internet.

Each communication platform (including SCPs 122a-122n and CCP 104 shown in FIG. 1) typically also includes a network mailbox (e.g., local network mailbox cache 230 shown in FIG. 2 or network mailbox 330 shown in FIG. 3), which may be stored in the memory of its corresponding communication platform. Network mailboxes contain subscriber information such as subscriber IDs, along with a portion of memory that is allocated for the storage of messages that are intended for each subscriber listed in the network mailbox. Network mailboxes can be linked directly to a communication platform. However, according to aspects of the present invention, network mailboxes are more typically made accessible through a switched network backbone.

The fundamental building block of the unified messaging network according to aspects of the present invention is the network mailbox. Each subscriber is assigned a unique network mailbox that stores messages of various types, including (without limitation) e-mail messages, voice mail messages, and fax messages. These various media types are "unified" in a single network mailbox, such that any combination of the various media types may be stored in a network mailbox at any given time. According to aspects of the present invention, subscribers can use their network mailboxes to send and receive messages from anywhere in the world through any of a number of different types of terminals, including phones, fax machines, pagers, web browsers or e-mail clients. Each individual subscriber has a unique network mailbox ID which is typically composed of the individual subscriber's home country code, his or her corporate main telephone number followed by his or her extension number. For example, a subscriber with extension "123" in a company with main number "4089548000" in the United States may be assigned the following network mailbox ID: "14089548000123." An individual subscriber may have one or more unique network mailbox IDs, with each network mailbox ID "pointing" to the same network mailbox.

In one embodiment of the present invention, a subscriber's network mailbox ID normally follows the same telephone numbering plan of the subscriber's home country, including the country code. Moreover, according to embodiments of the present invention, the unique network mailbox ID may be the same as one of the subscriber's private telephone numbers, such as the subscriber's home telephone, mobile phone, pager, etc. Such a scheme ensures that the subscriber's network mailbox ID is globally unique and easy to recognize. Moreover, as will be described in more detail later with reference to FIG. 7, a subscriber may also be assigned one or more unique Direct Inward Dialing ("DID") telephone numbers, which allow callers to reach an individual subscriber's network mailbox directly, instead of having to go through a PBX 102 (see FIG. 1). An individual subscriber's DID number, if available, may also be his or her network mailbox ID. A subscriber's network mailbox enables other people to communicate with the subscriber by voice message, fax or e-mail. The messages are electronically stored in the subscriber's network mailbox, waiting to be retrieved by the subscriber at any time.

As discussed earlier, the messaging network according to aspects of the present invention consists of one or more nodes, or communication platforms, in various parts of the world. The unified messaging services provided according to aspects of the present invention allow individual subscribers to manage their communications from anywhere in the world. All of an individual subscriber's messages are stored in the subscriber's permanent network mailbox on the subscriber's assigned SCP, as well as in the temporary cache mailbox on the subscriber's CCP. Because each SCP comprises a Web server and/or an e-mail server, using the present invention, an individual subscriber can manage all of his or her daily communication needs from any of a variety of suitable terminals, including telephones, fax machines, web browsers, and/or e-mail clients.

Thus, with a unified messaging network mailbox according to aspects of the present invention, once an individual subscriber's messages have been received and stored at the subscriber's assigned SCP, the subscriber can send and receive e-mail, fax, and/or voice messages from a variety of terminals, such as telephones, fax machines, web browsers (e.g., Microsoft™ Internet Explorer™, Netscape™ Navigator™) and/or POP3 or IMAP e-mail clients (e.g., Netscape™ Communicator™, Microsoft™ Outlook™. The subscriber's network mailbox is also a full-featured e-mail account with an e-mail address (e.g., user_phone_number@provider.com). Thus, a subscriber can view faxes, retrieve e-mail, and/or listen to voice messages on any multimedia computer from anywhere in the world. The subscriber can also forward a fax to co-workers from any browser, or reply to e-mail with voice messages. Finally, using a telephone or a fax machine, a subscriber can listen to voice messages and retrieve faxes, respectively.

Figure 4:
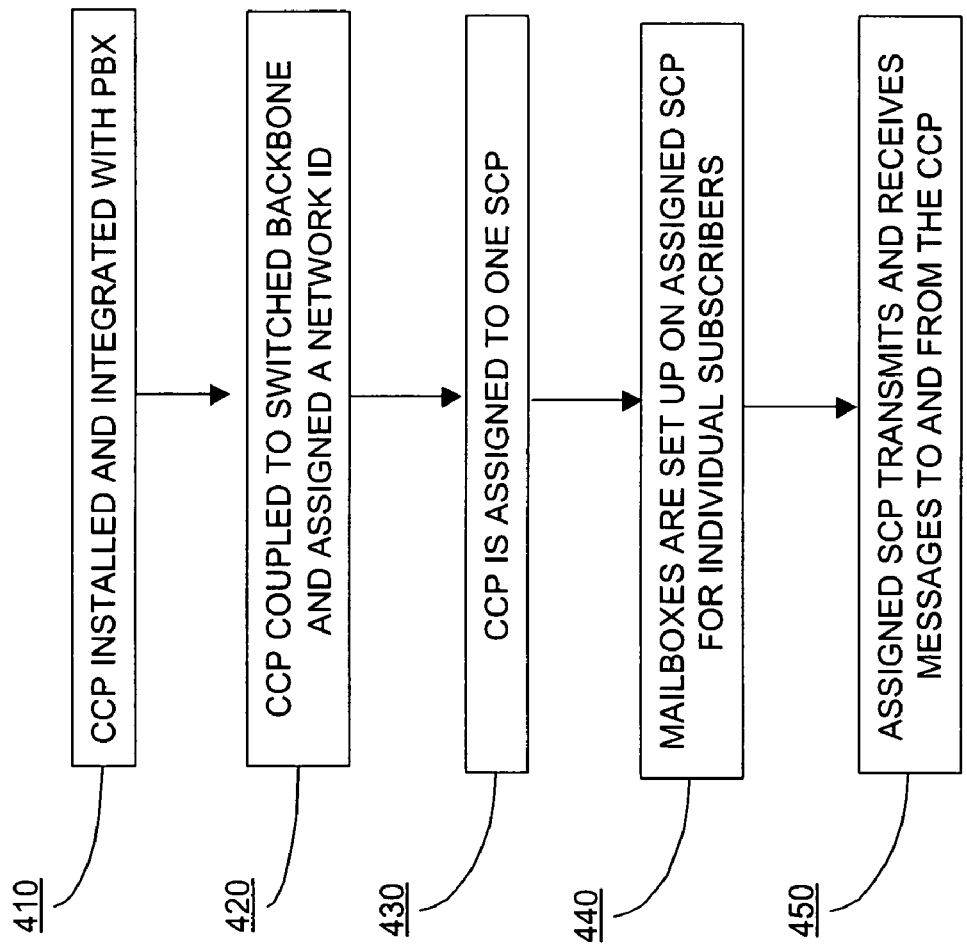
FIG. 4 is a flow chart of the steps taken to install and configure a corporate communication platform according to aspects of the present invention.

FIG. 4 is a flow chart of the steps taken to install and configure a corporate communication platform according to aspects of the present invention. At step 410, a CCP is installed (typically within the premises of a corporate subscriber) and integrated with the corporate subscriber's existing PBX. As mentioned earlier, the specific sub-steps required to perform step 410 depend entirely on the specific vendor and model of the PBX equipment involved. However, implementation details regarding integration with virtually every type of PBX equipment currently known are well within the knowledge of those of ordinary skill in the art.

At step 420, the CCP is coupled to the switched backbone and assigned a network identifier (such as an IP address). At step 430, the CCP is assigned to one of the SCPs accessible by the CCP over the switched backbone. At step 440, network mailboxes are set up on the assigned SCP for the individual subscribers who will have PBX-integrated unified messaging services enabled according to aspects of the present invention. During this step, information is provided to the assigned SCP specifying that the network mailboxes being set up also correspond to the CCP, a permanent mailbox is set up on the SCP, and a local (or "cache") mailbox is set up on the CCP. Finally, at step 450, the SCP transmits copies of all messages received at the SCP that correspond to each of the individual subscribers for whom network mailboxes were set up in step 440 to the CCP in accordance with the synchronization mechanisms described in this document. Also during step 450, the CCP receives messages from its assigned SCP that correspond to each of the individual subscribers for whom network mailboxes were set up in step 440 in accordance with the synchronization mechanisms described in this document.

From a business standpoint, providing PBX-integrated unified messaging services according to aspects of the present invention is very simple. First, a CCP is installed (typically at the corporate subscriber's premises) and configured in the manner described above with reference to FIG. 4. Purchasing a CCP is not required, since it can simply be provided under some sort of service arrangement, with the corporate subscriber typically paying a monthly fee for each individual subscriber who will have PBX-integrated unified messaging services enabled according to aspects of the present invention.

Figure 5:
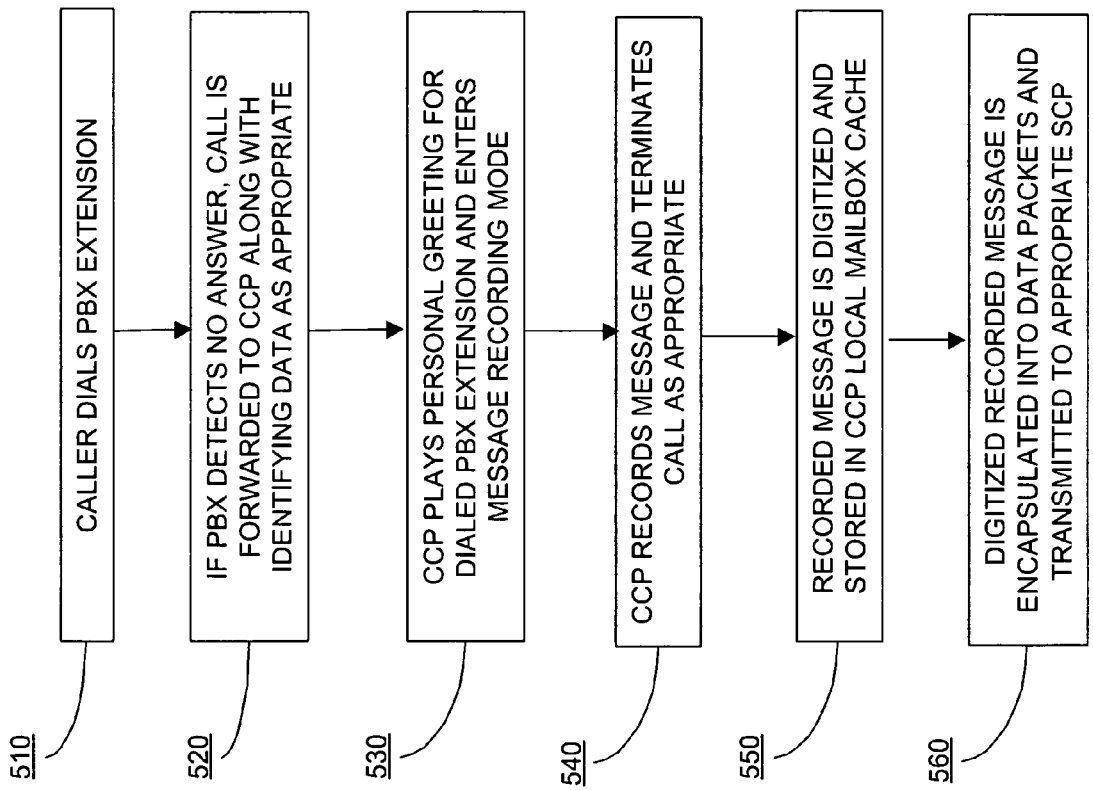
FIG. 5 is a flow chart of the steps taken to receive and store a message according to aspects of the present invention.

FIG. 5 is a flow chart of the steps taken to receive and store a message according to one embodiment of the present invention. It is to be understood that prior to performing the sequence of steps shown in FIG. 5, a CCP 104 must be integrated with a PBX 102 via PBX-CCP interface 103, as shown in FIG. 1 and described earlier with reference to FIG. 4. As is known to those of ordinary skill in the art, PBX integration includes not only the physical connections between PBX 102 and CCP 104, but may also include programming changes to PBX 102, wherein such programming changes are dependent on the specific vendor and model number of PBX 102. For example, if a specific corporate subscriber wishes to provide wide-area unified messaging services to fifteen of its individual subscribers according to aspects of the present invention (and assuming that these fifteen individual subscribers previously accessed messaging services through a PBX 102), then PBX 102 must be programmed to forward all calls dialed to the PBX extensions of these fifteen individual subscribers to CCP 104. PBX programming is well within the knowledge of one of ordinary skill in the art.

Referring now to FIG. 5, at step 510, a caller dials the PBX extension of an individual subscriber to place a call or to deliver a message. In this context, a caller may either be a subscriber or a non-subscriber, a message may include (without limitation) a voice message and/or a fax message, and the caller may place the call from another PBX extension 106a-106n (shown in FIG. 1) or from an "outside line" via any one of terminals 112a-112n and PSTN 110 (also shown in FIG. 1).

At step 520, if PBX 102 detects no answer by the called extension after a predetermined number of rings or preset amount of time, the call is forwarded to CCP 104 along with the appropriate control data using the appropriate PBX-CCP integration mechanism (which may be in-band and/or out of band). For example, in one embodiment using a Toshiba model DK-280 PBX 102, at step 520, in response to the incoming call, a port on the CCP 104 which receives the call goes "off-hook," and the Toshiba PBX immediately sends to the CCP port a sequence of DTMF digits representing the extension number where the call originates. In this example, if the call was intended to be received by PBX extension "123," the DTMF digit string "123" is sent to the CCP port receiving the call.

At step 530, CCP 104 plays the personal greeting associated with the called PBX extension and initiates a message recording mode. Continuing with the above example, at step 530, CCP 104, upon receiving the digit string "123", recognizes that this is call forwarded from extension 123, and immediately plays the personal greeting for the individual subscriber assigned to extension 123. The personal greeting is typically a recording made by the individual subscriber assigned to extension 123 requesting the caller to leave a voice message (although the personal greeting may also be a system default or other form of automatically generated greeting).

At step 540, CCP 104 records the message and terminates the call as appropriate. Continuing with the above example, at step 540, after CCP 104 plays the personal greeting associated with PBX extension "123," CCP 104 enters into the message recording mode, plays a "beep" tone to the caller, records the voice message, and terminates the call unless the caller terminates the call first. When the caller finishes recording the message, the caller typically hangs up, the CCP 104 detects this caller "hang-up" event, and terminates the recording. In the case of a fax message, CCP 104 detects the message type as a fax message, performs the appropriate handshaking with the calling fax machine by detecting the fax CNG tone, receives the fax message, and terminates the call, all in a manner well known to those of ordinary skill in the art.

At step 550, the recorded message is digitized and compressed (in the case of a voice message), and stored as a new message in the called individual subscriber's local mailbox on CCP 104. In the case of a fax message (since the message format is typically already digitized and compressed), the received fax message is simply stored in the called individual subscriber's local mailbox on CCP 104. In one embodiment of the present invention, step 550 is performed after the call has been terminated.

Still referring to FIG. 5, at step 560, the stored messages in an individual subscriber's local mailbox on CCP 104 are encapsulated into data packets (such as TCP/IP packets) and transmitted to the SCP 122 (shown in FIGS. 1 and 3) assigned to CCP 104. In one embodiment, after CCP 104 completes receiving a message, the message is encapsulated into one or more TCP/IP packets, and the packets representing the original message are transported to a specific SCP 122 residing within the unified messaging network via the Internet. Without limitation, in a corporate subscriber environment, the Internet can be accessed via the corporate subscriber's existing Internet connection, such as T1, DSL or ISDN. It should also be noted that, upon receiving a message, CCP 104 can command PBX 102 to activate the message waiting light of the individual subscriber for whom the message is intended.

As mentioned earlier, each CCP 104 is "assigned" to (or equivalently, "serviced" by) an SCP 122 on the wide-area unified messaging network shown in FIG. 1. The assigned SCP server 122 is responsible for monitoring the status of all of the CCPs 104 assigned to it. Each SCP 122 may service one or more CCPs 104. As will be described in more detail below, SCP 122 also provides synchronized storage for messages located in all of the CCPs 104 assigned to it. The communication protocols between a CCP 104 and SCPs 122 may be any of the popular data transfer protocols, including the File Transfer Protocol ("FTP") or the Remote Procedure Call ("RPC") protocols.

By "copying" messages from the local mailbox on CCP 104 to the "remote" mailbox on the appropriate SCP 122, an individual subscriber's mailboxes are "synchronized." As part of this synchronization, if an individual subscriber deletes a message from his or her local mailbox on CCP 104, a command is sent to the appropriate SCP 122 to delete the duplicate message on the remote mailbox. Similarly, messages added or deleted directly at a remote mailbox on a SCP 122 are synchronized with the messages stored in the local mailbox on CCP 104. However, since each SCP 122 may service more than one CCP 104, and because the SCPs 122 may transmit and receive many control and data message among themselves which may have nothing to do with a given CCP 104, not all changes to the network mailbox on the SCP 122 assigned to a CCP 104 are reported to the CCP 104. In this sense, a CCP 104 is "slaved" to the SCP 122 to which it is assigned.

Mailbox synchronization may be implemented using any suitable technique, depending on the requirements of each particular implementation. For example, and without limitation, synchronization messages may be transmitted by a communication platform immediately after a message is added or deleted at a mailbox, and/or synchronization messages may be queued for later transmission. Mailbox synchronization according to aspects of the present invention enables an individual subscriber to retrieve messages regardless of the physical location of the individual subscriber without perceptible and undesirable delays (i.e., regardless of whether the individual subscriber is currently retrieving messages from within the subscriber's premises 100 shown in FIG. 1 via PBX 102, whether the individual subscriber is currently retrieving messages via a remote PSTN coupled to any SCP 122 shown in FIG. 1, or whether the individual subscriber is currently retrieving messages using a data communication terminal 108 or 126a-126n via network 120). Moreover, because the unified messaging system according to aspects of the present invention constantly keeps track of the last known physical location of each individual subscriber, a subscriber's messages are almost always stored in the physical location closest to the individual subscriber. Among other benefits and advantages, this feature of the present invention minimizes delays in delivering messages to an individual subscriber.

Figure 6:
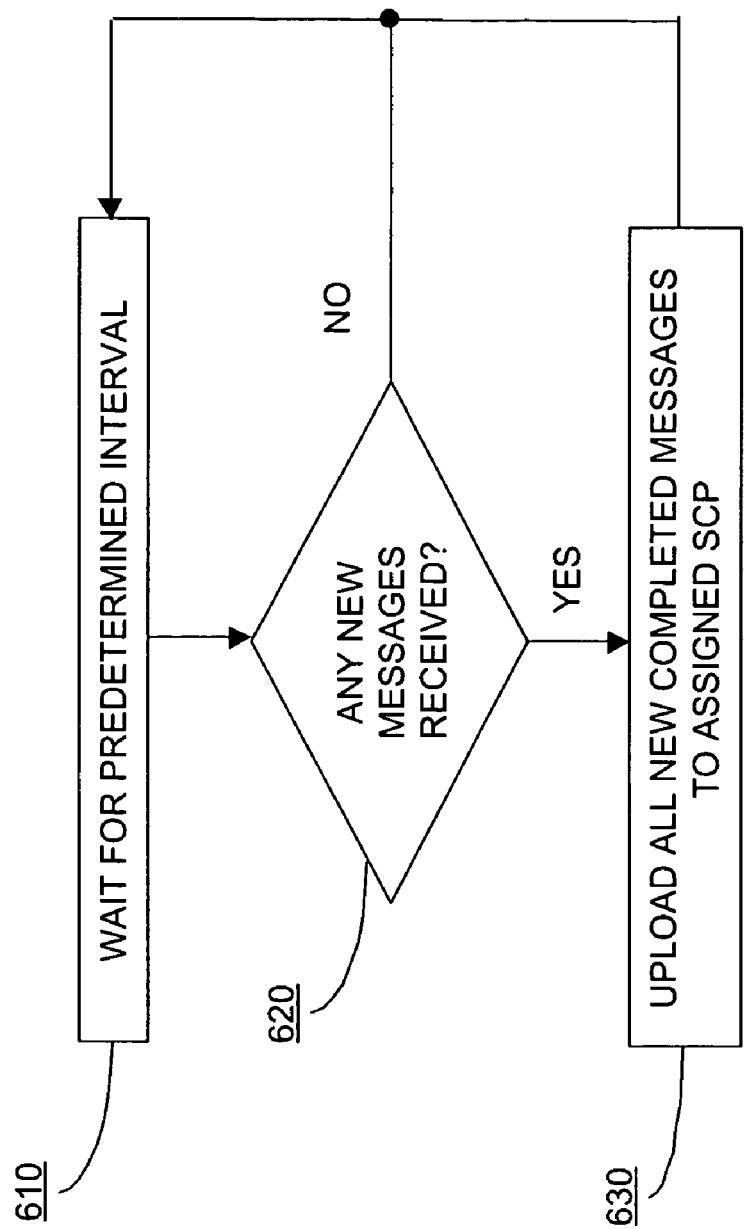
FIG. 6 is a flow chart of the steps taken to upload messages from a corporate communication platform according to one embodiment of the present invention.

FIG. 6 is a flow chart of the steps taken to upload messages from a corporate communication platform (CCP) according to one embodiment of the present invention. At step 610, a timer (e.g., 60 seconds) is continuously running on the CCP. At the end of each predetermined time interval, a decision is made at step 620 depending on whether any new messages were completely received by the CCP during the previous predetermined interval. If not, the process loops back to step 610. However, if any new messages were completely received during the previous predetermined interval, then the process continues with step 630, at which point all such completely received messages are uploaded to the assigned SCP from the CCP. After step 630, the process loops back to step 610. Those of ordinary skill in the art will recognize that many other mechanisms for uploading messages can be implemented within the scope of the present invention. For example, a message may be uploaded as soon as it is completely received, or messages could be uploaded only when a predetermined minimum number of messages have been received by a CCP.

Figure 7:
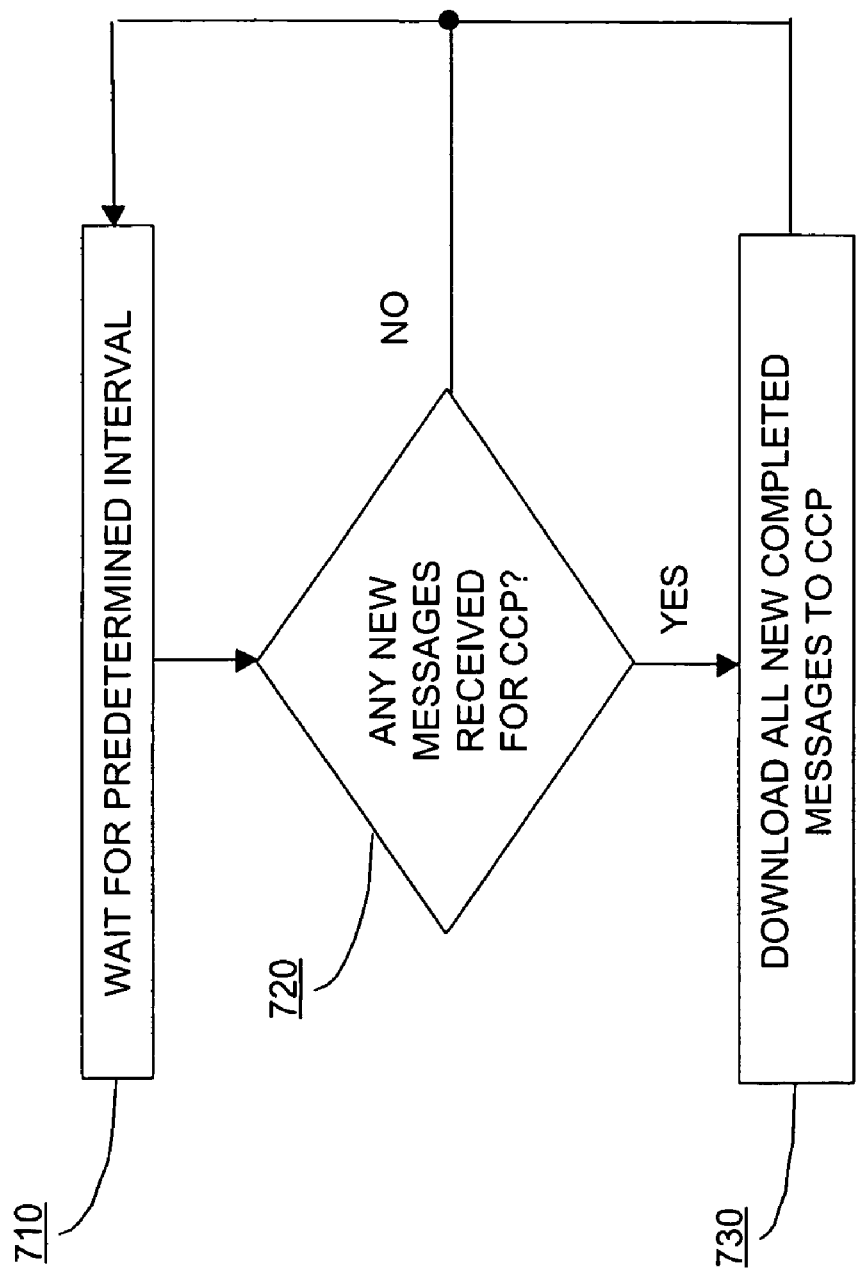
FIG. 7 is a flow chart of the steps taken to download messages from a system communication platform according to one embodiment of the present invention.

FIG. 7 is a flow chart of the steps taken to download messages from a system communication platform according to one embodiment of the present invention. Similar to the uploading process, at step 710, a timer (e.g., 60 seconds) is continuously running in the SCP assigned to a CCP. In general, this timer is not synchronized with the timer running on the CCP. At the end of each predetermined time interval, a decision is made at step 720 depending on whether any new messages were completely received by the SCP destined for the CCP during the previous predetermined interval. If not, the process loops back to step 710. However, if any new messages were completely received during the previous predetermined interval, then the process continues with step 730, at which point all such completely received messages are downloaded to the CCP from the SCP. After step 730, the process loops back to step 710. Those of ordinary skill in the art will recognize that many other mechanisms for downloading messages to a CCP can be implemented within the scope of the present invention. For example, a message may be downloaded as soon as it is completely received, or messages could be downloaded only when a predetermined minimum number of messages have been received by a SCP destined for a given CCP.

Figure 8:
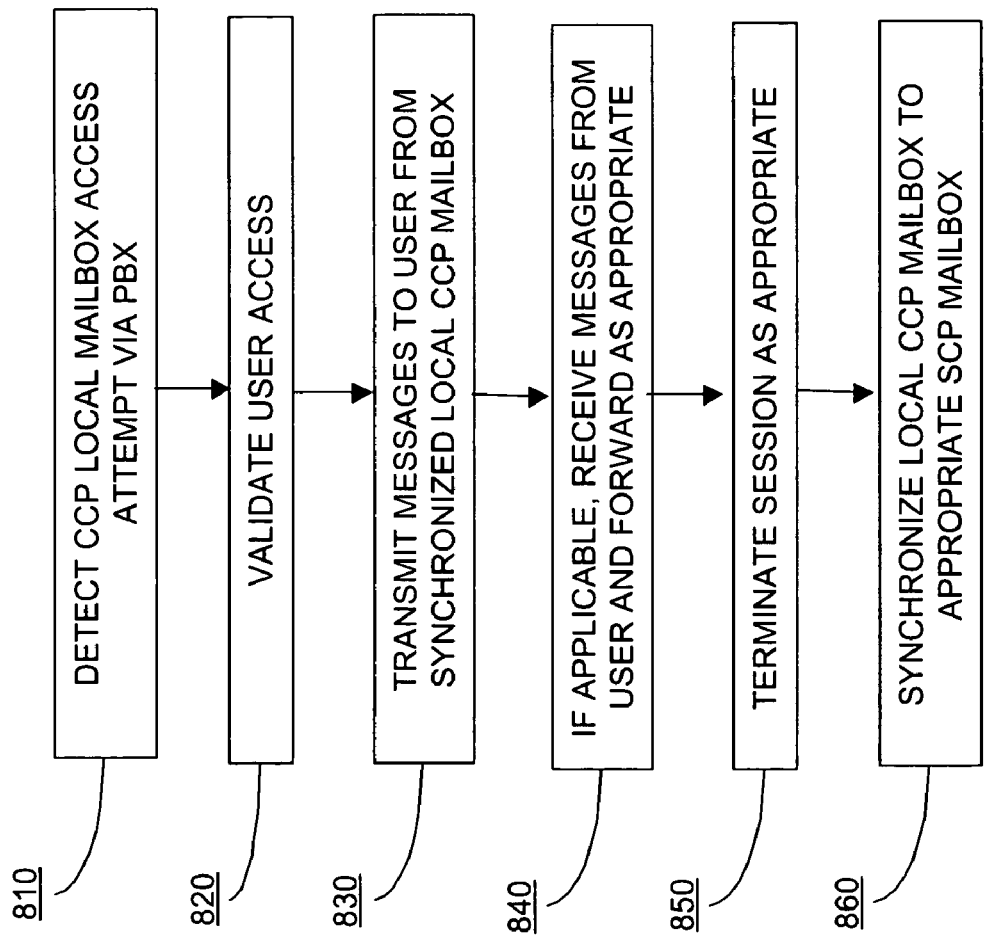
FIG. 8 is a flow chart of the steps taken to access and synchronize messages via a local mailbox in a corporate communication platform according to aspects of the present invention.

FIG. 8 is a flow chart of the steps taken to deliver and receive messages via a local mailbox in a CCP 104 according to aspects of the present invention. From the viewpoint of an individual subscriber, the flow chart illustrated in FIG. 8 lists the steps that a CCP 104 would perform to deliver messages to an individual subscriber to a voice telephone terminal or fax machine, and/or to receive additional messages from the individual subscriber destined to be forwarded to and stored in one or more mailboxes somewhere in the wide-area unified messaging network.

Referring to FIGS. 8 and 1, at step 810, CCP 104 detects a local mailbox access attempt via PBX 102 (e.g., from one of PBX extensions 106a-106n or from one of PSTN terminals 112a-112n). Since, in this scenario, CCP 104 is always accessed via PBX 102, CCP 104 appears as a set of extensions off the PBX 102, and the CCP 104 integrates with the PBX 102 to send and receive call control data such as calling/called extension number, message waiting light control, and the like.

At step 820, CCP 104 validates the individual subscriber's access attempt. In one embodiment, in the case of access via a voice telephone terminal, CCP 104 answers and plays a voice prompt to ask the subscriber to identify himself, such as through a password or personal identification number ("PIN") number and/or a subscriber ID number. In this case, data entry is through a standard telephone keypad that generates DTMF tones.

At step 830, messages are delivered from the local mailbox in CCP 104 to the individual subscriber. At step 840, if an individual subscriber so desires, additional messages can be received by CCP 104 for delivery to one or more network mailboxes somewhere in the wide-area unified messaging network according to aspects of the present invention. At step 850, the session is terminated in the appropriate manner, as described above with reference to FIG. 5. Finally, at step 860, the local mailbox for the individual subscriber in CCP 104 is synchronized with the appropriate "remote" mailbox on the SCP 122 assigned to service CCP 104. As described earlier with reference to FIG. 5, mailbox synchronization ensures that all copies of an individual subscriber's message mailbox are accurate and up to date. It should be noted that all changes to the local mailbox on a CCP 104 (including all additions and deletions of message on a subscriber's mailbox) are reported to the SCP 122 assigned to that CCP 104 in a timely manner. However, the converse is not necessarily true. As mentioned earlier, an SCP 122 assigned to a given CCP 104 may not need to synchronize all changes to its network mailbox with the CCP 104, particularly for changes relating to the individual mailboxes of subscribers not associated with CCP 104, but instead associated with a different CCP.

Figure 9:
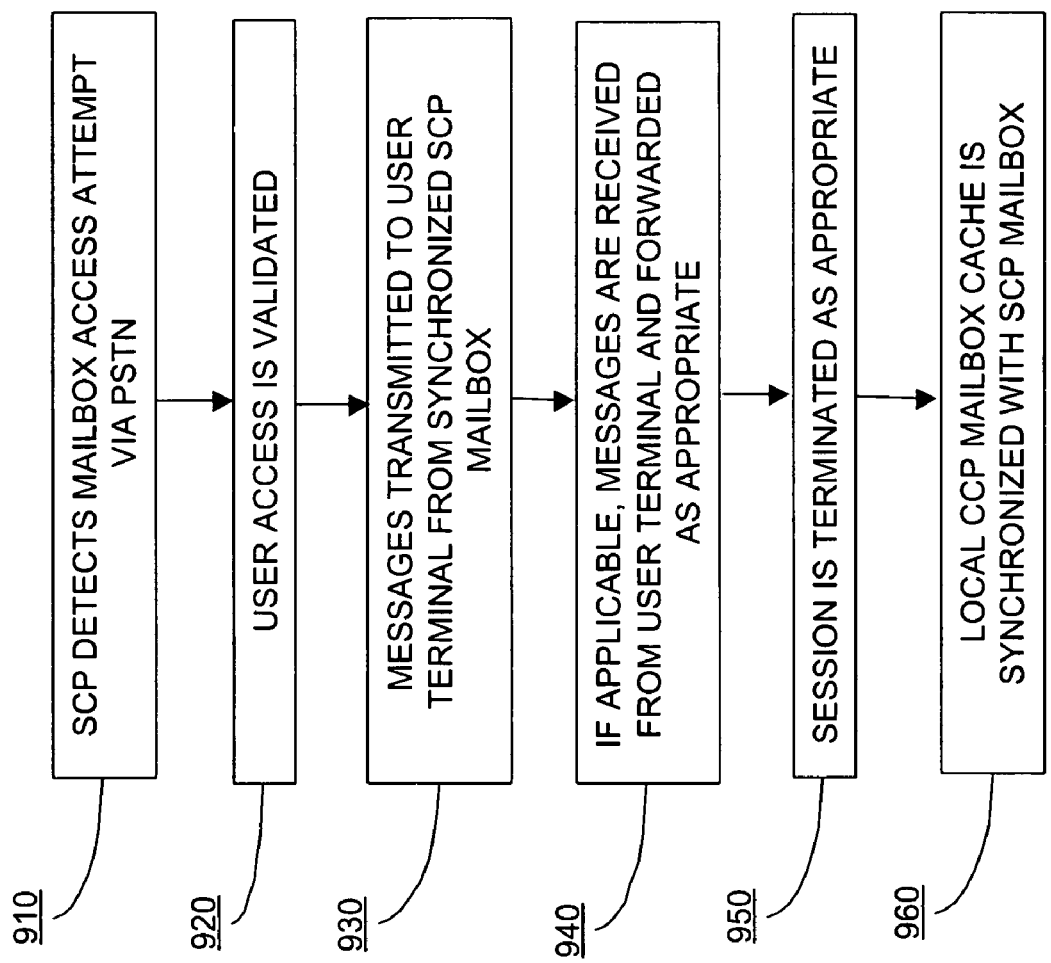
FIG. 9 is a flow chart of the steps taken to access and synchronize messages via a remote mailbox in a system communication platform according to aspects of the present invention.

FIG. 9 is a flow chart of the steps taken to deliver and receive messages via a remote mailbox in a SCP 122 according to aspects of the present invention. According to aspects of the present invention, an individual subscriber may directly dial the access telephone number for any one of the SCPs 122 via a PSTN, log on to his or her mailbox, retrieve voice message, check e-mail messages, and/or and print fax messages from his or her mailbox.

Referring now to FIG. 9, at step 910, an SCP 122 detects a mailbox access attempt by a PSTN coupled to the SCP. In this scenario, an individual subscriber accesses an SCP 122 (typically the SCP physically closest to the user) and provides information necessary to establish a communication session with the network. At step 920, user access is validated by the called SCP 122. In one embodiment, the SCP 122 may be configured to check whether the user is an authorized user (i.e., a "subscriber"), to provide directions to the subscriber by prompting, and to allow a subscriber to use network facilities when authorization is complete and valid. In one embodiment, data entry is accomplished through a standard telephone keypad that generates DTMF tones. Once the subscriber is logged on, SCP 122 will prompt the subscriber to select from various options, as described more fully below.

At step 930, messages are delivered via SCP 122 to the individual subscriber, as described more fully below. At step

940, if an individual subscriber so desires, additional messages can be received by SCP 122 for delivery to one or more network mailboxes somewhere in the wide-area unified messaging network according to aspects of the present invention. At step 950, the session is terminated in the appropriate manner, as described above with reference to FIG. 5. Finally, at step 960, the local mailbox for the individual subscriber in CCP 104 is synchronized with the appropriate "remote" mailbox on the SCP 122 assigned to service CCP 104.

Network mailboxes allow any caller to send voice messages to any individual subscriber. To send voice and/or fax messages, a caller simply accesses a subscriber's network mailbox and records a voice message or sends a fax message. The message is then sent to the recipient individual subscriber's network mailbox, at the physical location where the master communication platform has determined that the subscriber's network mailbox currently resides. The physical location of an individual subscriber's network mailbox is typically not known by either the individual subscriber or the caller, and is determined by the unified messaging network itself as a function of factors which may include the last known physical location of the individual subscriber or relative network node usage and/or load patterns.

Figure 10:
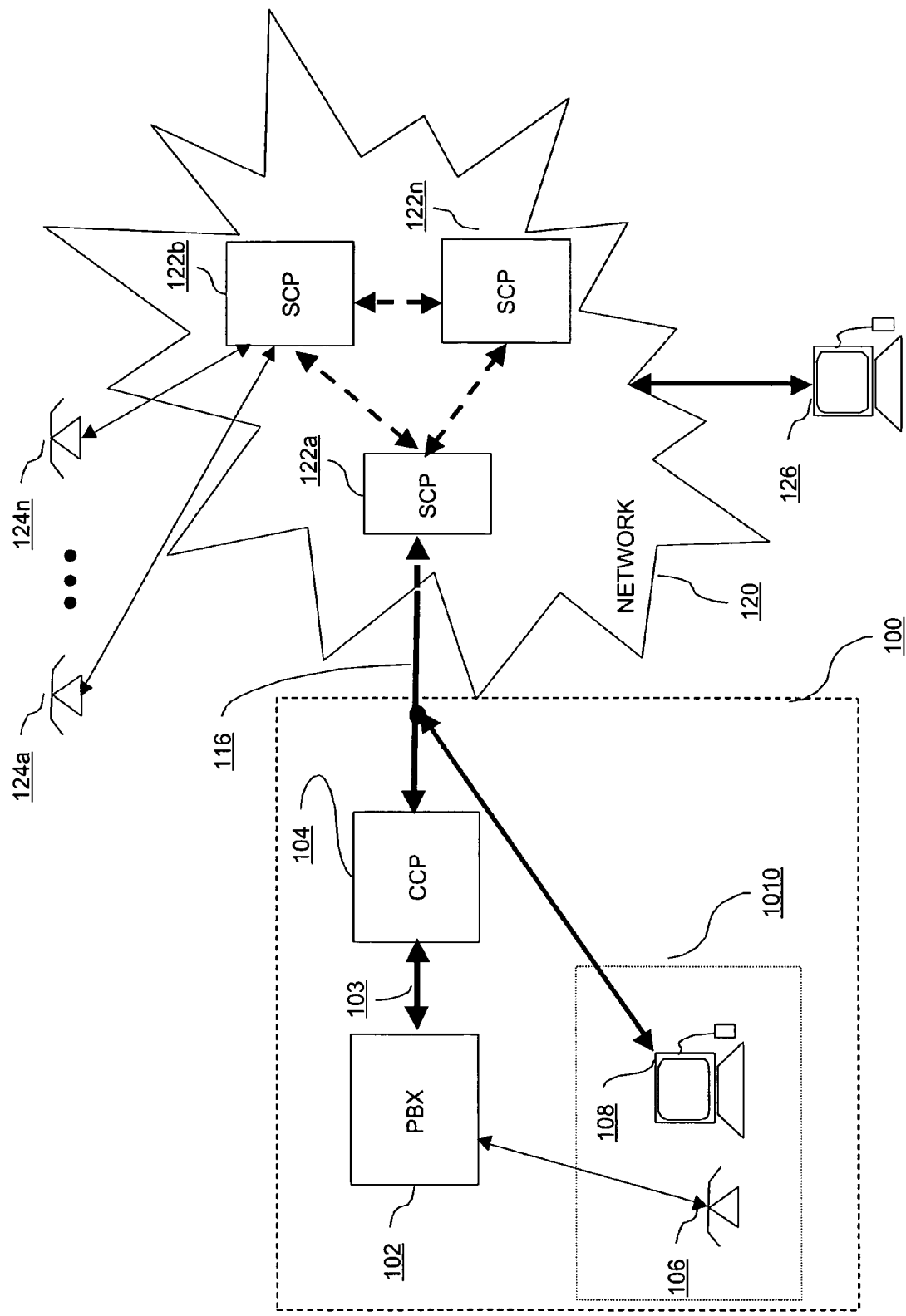
FIG. 10 is a schematic block diagram illustrating one application for a PBX-integrated unified messaging service-providing system according to aspects of the present invention.

FIG. 10 is a schematic block diagram illustrating one application for a unified messaging network integrated with a PBX system according to aspects of the present invention. Those of ordinary skill in the art will recognize that FIG. 10 is a simplified version of FIG. 1, where like elements have been labeled with identical reference numerals. However, in FIG. 10, a typical PBX extension terminal 106 optionally having a message waiting light (not shown) has been grouped with an optional data terminal 108 at a workstation or desk 1010 within the corporate subscriber's premises 100. Conceptually, an individual subscriber may be sitting at a workstation or desk 1010, on which a PBX voice terminal 106 (coupled to CCP 104 via PBX 102) and an optional data terminal 108 (coupled to CCP 104 and to network 120 via network interface 116) have been installed.

As is well known to those of ordinary skill in the art, a configuration wherein a PBX voice terminal 106 coupled to a PBX 102 and a data terminal 108 coupled to a network 120 are installed at a user's workstation or desk 1010 is ubiquitous. Such a configuration represents the typical desktop of a corporate employee, with a PBX voice extension handset 106 and a personal computer 108 coupled to the Internet on his or her desk. However, the novel configuration shown in FIGS. 1 and 10 and described throughout this document, coupled with one or more DID numbers assigned to be serviced by an SCP 122 (described next) provides yet another set of advantages.

In accordance with these aspects of the present invention, an individual subscriber is assigned one or more Direct Inward Dialing ("DID") numbers that are serviced by one or more SCPs 122 on the network For example, an individual subscriber working and living in the vicinity of San Jose, Calif., may be assigned DID number 408-1234567. As shown in FIG. 10, this DID number is "assigned" to SCP 122*b*, which in this example would also be physically located in the same area code (i.e., "408") as the DID number. Optimally (from the standpoint of reducing caller confusion), the DID and the main phone number of PBX 102 are in the same area code, but this is not required. If the same individual subscriber frequently travels to Washington, D.C., then the individual subscriber may for example be assigned the additional DID number 202-765-4321. As shown in FIG. 10, this Washington D.C. DID number may be "assigned" to SCP 122*n*, which in this example would also be physically located in the same area code (i.e., "202") as the Washington D.C. DID number. There is no limit to the number of DID numbers that may be assigned.

For maximum convenience and utility according to these aspects of the present invention, the individual subscriber uses a DID number both as a telephone number into which callers may dial to leave voice or fax messages, and as a "forwarding target" for the individual subscriber's other telephone services. For example, while the individual subscriber is sitting at his or her desk 1010, he or she may activate call forwarding from his or her home phone number, mobile phone number and/or any other appropriate phone numbers a DID number. In this manner, any phone call originally dialed from any of the forwarding numbers will be forwarded to that DID number, and the SCP assigned to service that DID number, upon "answering" the call, will receive and store a voice message or fax message as appropriate. Any such messages will be forwarded to the local message mailbox cache (see FIG. 2) of CCP 104 (see FIGS. 2 and 10) in a timely manner (see FIG. 7 and the associated description above). Upon receiving any such messages, CCP 104 can command PBX 102 to activate the message waiting light of PBX voice extension terminal 106. Optionally, if data terminal 108 is installed at the individual subscriber's desk 1010 and if data terminal 108 is executing a web browser or e-mail client application, data terminal 108 can be programmed in a manner that is well-known to those of ordinary skill in the art to provide a visual and/or auditory indication that a message has been received.

From the viewpoint of an individual subscriber, this configuration provides the individual subscriber with a single point of access for all of his or her messages, regardless of the original phone number or e-mail account to which each message was originally destined. When the individual subscriber is at his or her desk 106, the message waiting light on the PBX voice extension terminal 106 will indicate that a message has been received, irrespective of whether the message came from a call originally placed to the subscriber's home phone, work phone, mobile home, fax line, or even if the "message" is an e-mail message (which may contain any form of attachment) that was forwarded to the e-mail account associated with the individual subscriber's network mailbox. And if data terminal 108 is also available, then the individual subscriber may retrieve all of his or her voice messages, fax messages, and/or e-mail messages from a single point of access, directly from a web browser or e-mail client executing on data terminal 108.

Even when the individual subscriber is not physically located at his or her desk 1010, the individual subscriber may retrieve all of his or her voice messages, fax messages, and/or e-mail messages from a single point of access, directly from a web browser or e-mail client executing on a data terminal 126, which can be located anywhere in the world that is accessible via network 120.

While embodiments and applications of this invention have been shown and described, it would be apparent to those of ordinary skill in the art having the benefit of this disclosure that many more modifications than mentioned above are possible without departing from the inventive concepts herein. The invention, therefore, is not to be restricted except in the spirit of the appended claims.

What is claimed is:

1. A system for providing PBX-integrated unified messaging services including voice messaging, fax messaging, and e-mail messaging on a wide-area network, comprising:

one or more corporate communication platforms, each of said one or more corporate communication platforms coupled to a switched backbone, integrated with a PBX via a PBX interface, and comprising a slave message mailbox cache; and a plurality of system communication platforms coupled to said switched backbone, wherein one such system communication platform comprises a master communication platform configured to update a subscriber database in each of said plurality of system communication platforms to reflect changes to a global subscriber database when said master communication platform determines said global subscriber database has changed, and wherein one such system communication platform comprises a master message mailbox, each of said slave message mailbox cache and said master message mailbox configured to store a plurality of message types, said message types comprising email, voicemail, and fax, wherein said slave message mailbox cache is bi-directionally synchronized in real-time with said master message mailbox such that each change to said slave message mailbox cache is reported immediately to said one such system communication platform, each change to a message in said master message mailbox that is associated with a corporate communication platform comprising said slave message mailbox cache is reported immediately to said corporate communication platform comprising said slave message mailbox cache, and each change to a message in said master message mailbox that is not associated with said corporate communication platform comprising said slave message mailbox cache is not reported to the corporate communication platform comprising said slave message mailbox cache, each of said one or more corporate communication platforms assigned to one of said plurality of system communication platforms, each of said plurality of system communication platforms assigned to zero or more of said one or more corporate communication platforms.

2. The system of claim 1, wherein said switched backbone is the Internet.

3. The system of claim 2, wherein said PBX interface is managed and controlled through program control, said program control established by using modules that make API calls to a programming interface, wherein said corporate communication platform can deliver a message to and receive a message from extensions defined within said PBX.

4. The system of claim 3, wherein said corporate communication platform can command said PBX to activate a message waiting light on a PBX user's voice terminal equipment when a message for said PBX user is transmitted from said master message mailbox to said slave mailbox cache.

5. The system of claim 4, wherein said PBX is selected from a group consisting of analog PBXs, digital PBXs, Centrex PBXs and Internet Protocol ("IP") PBXs.

6. The system of claim 3, wherein said PBX is selected from a group consisting of analog PBXs, digital PBXs, Centrex PBXs and Internet Protocol ("IP") PBXs.

7. The system of claim 2, wherein said corporate communication platform can command said PBX to activate a message waiting light on a PBX user's voice terminal equipment when a message for said PBX user is transmitted from said master message mailbox to said slave mailbox cache.

8. The system of claim 7, wherein said PBX is selected from a group consisting of analog PBXs, digital PBXs, Centrex PBXs and Internet Protocol ("IP") PBXs.

9. The system of claim 2, wherein said PBX is selected from a group consisting of analog PBXs, digital PBXs, Centrex PBXs and Internet Protocol ("IP") PBXs.

10. The system of claim 1, wherein said PBX interface is managed and controlled through program control, said program control established by using modules that make API calls to a programming interface, wherein said corporate communication platform can deliver a message to and receive a message from extensions defined within said PBX.

11. The system of claim 10, wherein said corporate communication platform can command said PBX to activate a message waiting light on a PBX user's voice terminal equipment when a message for said PBX user is transmitted from said master message mailbox to said slave mailbox cache.

12. The system of claim 11, wherein said PBX is selected from a group consisting of analog PBXs, digital PBXs, Centrex PBXs and Internet Protocol ("IP") PBXs.

13. The system of claim 10, wherein said PBX is selected from a group consisting of analog PBXs, digital PBXs, Centrex PBXs and Internet Protocol ("IP") PBXs.

14. The system of claim 1, wherein said corporate communication platform can command said PBX to activate a message waiting light on a PBX user's voice terminal equipment when a message for said PBX user is transmitted from said master message mailbox to said slave mailbox cache.

15. The system of claim 14, wherein said PBX is selected from a group consisting of analog PBXs, digital PBXs, Centrex PBXs and Internet Protocol ("IP") PBXs.

16. The system of claim 1, wherein said PBX is selected from a group consisting of analog PBXs, digital PBXs, Centrex PBXs and Internet Protocol ("IP") PBXs.

17. An apparatus for providing PBX-integrated unified messaging services including voice messaging, fax messaging, and e-mail messaging on a wide-area network, comprising:

one or more corporate communication platforms, each of said one or more corporate communication platforms coupled to a switched backbone, integrated with a PBX via a PBX interface, and comprising a slave message mailbox cache, wherein said slave message mailbox cache is bi-directionally synchronized in real-time with a master message mailbox accessible via said switched backbone such that each change to said slave message mailbox cache is reported immediately to a system communication platform comprising said master message mailbox, each change to a message in said master message mailbox that is associated with a corporate communication platform comprising said slave message mailbox cache is reported immediately to said corporate communication platform comprising said slave message mailbox cache, and each change to a message in said master message mailbox that is not associated with said corporate communication platform comprising said slave message mailbox cache is not reported to the corporate communication platform comprising said slave message mailbox cache, each of said one or more corporate communication platforms assigned to one of a plurality of system communication platforms, each of said plurality of system communication platforms assigned to zero or more of said one or more corporate communication platforms, wherein one such system communication platform comprises a master communication platform configured to update a subscriber database in each of said plurality of system communication platforms to reflect changes to said global subscriber database when said master communication platform determines a global subscriber database has changed, and each of said slave message mailbox cache and said master message mailbox configured to store a plurality of message types, said message types comprising email, voicemail, and fax.

18. The apparatus of claim 17, wherein said switched backbone is the Internet.

19. The apparatus of claim 18, wherein said PBX interface is managed and controlled through program control, said program control established by using modules that make API calls to a programming interface, wherein said corporate communication platform can deliver a message to and receive a message from extensions defined within said PBX.

20. The apparatus of claim 19, wherein said corporate communication platform can command said PBX to activate a message waiting light on a PBX user's voice terminal equipment when a message for said PBX user is transmitted from said master message mailbox to said slave mailbox cache.

21. The apparatus of claim 20, wherein said PBX is selected from a group consisting of analog PBXs, digital PBXs, Centrex PBXs and Internet Protocol ("IP") PBXs.

22. The apparatus of claim 19, wherein said PBX is selected from a group consisting of analog PBXs, digital PBXs, Centrex PBXs and Internet Protocol ("IP") PBXs.

23. The apparatus of claim 18, wherein said corporate communication platform can command said PBX to activate a message waiting light on a PBX user's voice terminal equipment when a message for said PBX user is transmitted from said master message mailbox to said slave mailbox cache.

24. The apparatus of claim 23, wherein said PBX is selected from a group consisting of analog PBXs, digital PBXs, Centrex PBXs and Internet Protocol ("IP") PBXs.

25. The apparatus of claim 18, wherein said PBX is selected from a group consisting of analog PBXs, digital PBXs, Centrex PBXs and Internet Protocol ("IP") PBXs.

26. The apparatus of claim 17, wherein said PBX interface is managed and controlled through program control, said program control established by using modules that make API calls to a programming interface, wherein said corporate communication platform can deliver a message to and receive a message from extensions defined within said PBX.

27. The apparatus of claim 26, wherein said corporate communication platform can command said PBX to activate a message waiting light on a PBX user's voice terminal equipment when a message for said PBX user is transmitted from said master message mailbox to said slave mailbox cache.

28. The apparatus of claim 27, wherein said PBX is selected from a group consisting of analog PBXs, digital PBXs, Centrex PBXs and Internet Protocol ("IP") PBXs.

29. The apparatus of claim 26, wherein said PBX is selected from a group consisting of analog PBXs, digital PBXs, Centrex PBXs and Internet Protocol ("IP") PBXs.

30. The apparatus of claim 17, wherein said corporate communication platform can command said PBX to activate a message waiting light on a PBX user's voice terminal equipment when a message for said PBX user is transmitted from said master message mailbox to said slave mailbox cache.

31. The apparatus of claim 30, wherein said PBX is selected from a group consisting of analog PBXs, digital PBXs, Centrex PBXs and Internet Protocol ("IP") PBXs.

32. The apparatus of claim 17, wherein said PBX is selected from a group consisting of analog PBXs, digital PBXs, Centrex PBXs and Internet Protocol ("IP") PBXs.

33. A method of providing PBX-integrated unified messaging services including voice messaging, fax messaging, and e-mail messaging to one or more individual subscribers associated with a corporate subscriber, comprising:
  integrating a corporate communication platform with said corporate subscriber's PBX system via a PBX interface;
  coupling said corporate communication platform to a switched backbone and assigning a network identifier to said corporate communication platform;
  assigning said corporate communication platform to be serviced by a system communication platform accessible via said switched backbone, wherein said corporate communication platform comprises a slave message mailbox cache bi-directionally synchronized in real-time with a master message mailbox on said system communication platform such that each change to said slave message mailbox cache is reported immediately to said system communication platform, each change to a message in said master message mailbox that is associated with said corporate communication platform comprising said slave message mailbox cache is reported immediately to said corporate communication platform, and each change to a message in said master message mailbox that are not associated with said corporate communication platform comprising said slave message mailbox cache is not reported to said corporate communication platform comprising said slave message mailbox cache, said corporate communication platform assigned to one of a plurality of system communication platforms, said system communication platform assigned to zero or more corporate communication platforms, wherein one such system communication platform comprises a master communication platform configured to update a subscriber database in each of said plurality of system communication platforms to reflect changes to said global subscriber database when said master communication platform determines a global subscriber database has changed, each of said slave message mailbox cache and said master message mailbox configured to store a plurality of message types, said message types comprising email, voicemail, and fax;
  initializing a network mailbox on said system communication platform for each individual subscribers; and
  transmitting copies of all messages received at said system communication platform that correspond to each of said individual subscribers to said corporate communication platform.

34. The method of claim 33, wherein said switched backbone is the Internet.

35. The method of claim 34, wherein said PBX interface is managed and controlled through program control, said program control established by using modules that make API calls to a programming interface, wherein said corporate communication platform can deliver a message to and receive a message from extensions defined within said PBX.

36. The method of claim 35, wherein said corporate communication platform can command said PBX to activate a message waiting light on a PBX user's voice terminal equipment when a message for said PBX user is transmitted from said master message mailbox to said slave mailbox cache.

37. The method of claim 36, wherein said PBX is selected from a group consisting of analog PBXs, digital PBXs, Centrex PBXs and Internet Protocol ("IP") PBXs.

38. The method of claim 35, wherein said PBX is selected from a group consisting of analog PBXs, digital PBXs, Centrex PBXs and Internet Protocol ("IP") PBXs.

39. The method of claim 34, wherein said corporate communication platform can command said PBX to activate a message waiting light on a PBX user's voice terminal equipment when a message for said PBX user is transmitted from said master message mailbox to said slave mailbox cache.

40. The method of claim 39, wherein said PBX is selected from a group consisting of analog PBXs, digital PBXs, Centrex PBXs and Internet Protocol ("IP") PBXs.

41. The method of claim 34, wherein said PBX is selected from a group consisting of analog PBXs, digital PBXs, Centrex PBXs and Internet Protocol ("IP") PBXs.

42. The method of claim 33, wherein said PBX interface is managed and controlled through program control, said program control established by using modules that make API calls to a programming interface, wherein said corporate communication platform can deliver a message to and receive a message from extensions defined within said PBX.

43. The method of claim 42, wherein said corporate communication platform can command said PBX to activate a message waiting light on a PBX user's voice terminal equipment when a message for said PBX user is transmitted from said master message mailbox to said slave mailbox cache.

44. The method of claim 43, wherein said PBX is selected from a group consisting of analog PBXs, digital PBXs, Centrex PBXs and Internet Protocol ("IP") PBXs.

45. The method of claim 42, wherein said PBX is selected from a group consisting of analog PBXs, digital PBXs, Centrex PBXs and Internet Protocol ("IP") PBXs.

46. The method of claim 33, wherein said corporate communication platform can command said PBX to activate a message waiting light on a PBX user's voice terminal equipment when a message for said PBX user is transmitted from said master message mailbox to said slave mailbox cache.

47. The method of claim 46, wherein said PBX is selected from a group consisting of analog PBXs, digital PBXs, Centrex PBXs and Internet Protocol ("IP") PBXs.

48. The method of claim 33, wherein said PBX is selected from a group consisting of analog PBXs, digital PBXs, Centrex PBXs and Internet Protocol ("IP") PBXs.

49. An apparatus of providing PBX-integrated unified messaging services including voice messaging, fax messaging, and e-mail messaging to one or more individual subscribers associated with a corporate subscriber, comprising:
   means for integrating a corporate communication platform with said corporate subscriber's PBX system via a PBX interface;
   means for coupling said corporate communication platform to a switched backbone and assigning a network identifier to said corporate communication platform;
   means for assigning said corporate communication platform to be serviced by a system communication platform accessible via said switched backbone, wherein said corporate communication platform comprises a slave message mailbox cache bi-directionally synchronized in real-time with a master message mailbox on said system communication platform such that each change to said slave message mailbox cache is reported immediately to said system communication platform, each change to a message in said master message mailbox that is associated with said corporate communication platform comprising said slave message mailbox cache is reported immediately to said corporate communication platform, and each change to a message in said master message mailbox that are not associated with said corporate communication platform comprising said slave message mailbox cache is not reported to said corporate communication platform comprising said slave message mailbox cache, said corporate communication platform assigned to one of a plurality of system communication platforms, said system communication platform assigned to zero or more corporate communication platforms, wherein one such system communication platform comprises a master communication platform configured to update a subscriber database in each of said plurality of system communication platforms to reflect changes to said global subscriber database when said master communication platform determines said a global subscriber database has changed, each of said slave message mailbox cache and said master message mailbox configured to store a plurality of message types, said message types comprising email, voicemail, and fax;
   means for initializing a network mailbox on said system communication platform for each said individual subscribers; and
   means for transmitting copies of all messages received at said system communication platform that correspond to each of individual subscribers to said corporate communication platform.

50. The apparatus of claim 49, wherein said switched backbone is the Internet.

51. The apparatus of claim 50, wherein said PBX interface is managed and controlled through program control, said program control established by using modules that make API calls to a programming interface, wherein said corporate communication platform can deliver a message to and receive a message from extensions defined within said PBX.

52. The apparatus of claim 51, wherein said corporate communication platform further comprises means for commanding said PBX to activate a message waiting light on a PBX user's voice terminal equipment when a message for said PBX user is transmitted from said master message mailbox to said slave mailbox cache.

53. The apparatus of claim 52, wherein said PBX is selected from a group consisting of analog PBXs, digital PBXs, Centrex PBXs and Internet Protocol ("IP") PBXs.

54. The apparatus of claim 51, wherein said PBX is selected from a group consisting of analog PBXs, digital PBXs, Centrex PBXs and Internet Protocol ("IP") PBXs.

55. The apparatus of claim 50, wherein said corporate communication platform further comprises means for commanding said PBX to activate a message waiting light on a PBX user's voice terminal equipment when a message for said PBX user is transmitted from said master message mailbox to said slave mailbox cache.

56. The apparatus of claim 55, wherein said PBX is selected from a group consisting of analog PBXs, digital PBXs, Centrex PBXs and Internet Protocol ("IP") PBXs.

57. The apparatus of claim 50, wherein said PBX is selected from a group consisting of analog PBXs, digital PBXs, Centrex PBXs and Internet Protocol ("IP") PBXs.

58. The apparatus of claim 49, wherein said PBX interface is managed and controlled through program control, said program control established by using modules that make API calls to a programming interface, wherein said corporate communication platform can deliver a message to and receive a message from extensions defined within said PBX.

59. The apparatus of claim 58, wherein said corporate communication platform further comprises means for commanding said PBX to activate a message waiting light on a PBX user's voice terminal equipment when a message for said PBX user is transmitted from said master message mailbox to said slave mailbox cache.

60. The apparatus of claim 59, wherein said PBX is selected from a group consisting of analog PBXs, digital PBXs, Centrex PBXs and Internet Protocol ("IP") PBXs.

61. The apparatus of claim 58, wherein said PBX is selected from a group consisting of analog PBXs, digital, PBXs, Centrex PBXs and Internet Protocol ("IP") PBXs.

62. The apparatus of claim 49, wherein said corporate communication platform further comprises means for commanding said PBX to activate a message waiting light on a PBX user's voice terminal equipment when a message for said PBX user is transmitted from said master message mailbox to said slave mailbox cache.

63. The apparatus of claim 62, wherein said PBX is selected from a group consisting of analog PBXs, digital PBXs, Centrex PBXs and Internet Protocol ("IP") PBXs.

* * * * *